US010506847B2

(12) United States Patent
Roth

(10) Patent No.: US 10,506,847 B2
(45) Date of Patent: Dec. 17, 2019

(54) REINFORCED SHOE HEEL AND METHODS FOR MANUFACTURING SHOES INCORPORATING THE SAME

(71) Applicant: Centripetal Entertainment LLC, Los Angeles, CA (US)

(72) Inventor: Jennifer Roth, Los Angeles, CA (US)

(73) Assignee: Centripetal Entertainment LLC, Los Angeles, CA (US)

( * ) Notice: Subject to any disclaimer, the term of this patent is extended or adjusted under 35 U.S.C. 154(b) by 0 days.

(21) Appl. No.: 15/858,910

(22) Filed: Dec. 29, 2017

(65) Prior Publication Data

US 2018/0368522 A1    Dec. 27, 2018

Related U.S. Application Data

(60) Provisional application No. 62/524,412, filed on Jun. 23, 2017.

(51) Int. Cl.
| | |
|---|---|
| *A43B 21/24* | (2006.01) |
| *B29D 35/12* | (2010.01) |
| *A43B 21/38* | (2006.01) |
| *A43B 21/02* | (2006.01) |

(52) U.S. Cl.
CPC ............. *A43B 21/24* (2013.01); *A43B 21/02* (2013.01); *A43B 21/38* (2013.01); *B29D 35/124* (2013.01)

(58) Field of Classification Search
CPC ..... A43B 3/0036; A43B 3/0078; A43B 21/24; A43B 21/38
USPC .......................................... D2/966, 964, 965
See application file for complete search history.

(56) References Cited

U.S. PATENT DOCUMENTS

| | | | |
|---|---|---|---|
| 1,609,918 A | 12/1926 | Perugia | |
| 1,718,177 A | 6/1929 | Nutt | |
| 1,857,475 A | 5/1932 | Quirk | |
| 2,093,354 A | 9/1937 | Grinde | |
| D122,122 S * | 8/1940 | Korda | ............ D2/966 |
| 2,284,328 A * | 5/1942 | Korda | .......... A43B 21/24 36/34 R |
| 2,321,734 A | 6/1943 | Clausing | |
| D177,667 S * | 5/1956 | D'Or | ............ D2/926 |
| D186,842 S * | 12/1959 | Mehr | ............ 36/34 R |
| 2,925,671 A | 2/1960 | Del Giudice et al. | |
| 3,216,133 A | 11/1965 | Houle | |

(Continued)

FOREIGN PATENT DOCUMENTS

| | | | | |
|---|---|---|---|---|
| EP | 3 069 627 A1 | 9/2016 | | |
| WO | WO 8805272 | * | 7/1988 | ............ A43B 13/34 |

*Primary Examiner* — Ted Kavanaugh
(74) *Attorney, Agent, or Firm* — Davin M. Stockwell; Orrick, Herrington & Sutcliffe LLP

(57) ABSTRACT

The reinforced shoe heel includes an angled platform having a surface area for supporting a heel section of a shoe, a core including a plate and at least one reinforcement rod extending therefrom, the plate having a size and shape for select imbedded seated reception on a top surface of the angled platform, and a support coupled with and extending below the angled platform, the support being positioned in relation relative to the core to selectively receive the at least one reinforcement rod projecting from the plate. The reinforcement rod cooperates with the top-mounted plate to increase the relative structural rigidity of the reinforced shoe heel to generally relatively resist torsion, compressive, and shear stresses during use when attached to the shoe.

36 Claims, 23 Drawing Sheets

(56) References Cited

U.S. PATENT DOCUMENTS

| | | | |
|---|---|---|---|
| 4,128,609 A | 12/1978 | Rawson | |
| D690,913 S * | 10/2013 | Gordon | D2/939 |
| D744,220 S | 12/2015 | Slimane | |
| 9,491,986 B1 | 11/2016 | Dixon et al. | |
| 2006/0218820 A1* | 10/2006 | Baden | A43B 3/0031 |
| | | | 36/34 R |
| 2007/0062066 A1* | 3/2007 | Cirolia | A43B 21/025 |
| | | | 36/34 R |
| 2012/0117830 A1* | 5/2012 | Chen | A43B 3/0078 |
| | | | 36/34 R |
| 2014/0290100 A1 | 10/2014 | Flowers | |
| 2014/0325879 A1 | 11/2014 | Roccella | |
| 2016/0235163 A1* | 8/2016 | Alander | A43B 21/42 |

\* cited by examiner

REINFORCED SHOE HEEL AND METHODS FOR MANUFACTURING SHOES INCORPORATING THE SAME

BACKGROUND OF THE INVENTION

The present invention generally relates to a reinforced shoe heel and methods for manufacturing shoes incorporating the same. More specifically, the present invention relates to a reinforced high-heel that includes a support that may be formed into the shape of any alphanumeric character or symbol and an integral angled support platform that cooperates with an angled support plate and pair of internally placed support rods to enhance the strength, alignment, stability, and support of the high-heel shoe.

High-heel shoes are a type of shoe where the heel is positioned at an elevated position relative to the location of the toe. In some cases, the elevation can be several inches (e.g., commonly referred to as two-inch or three-inch high-heel shoes). Accordingly, while high-heel shoes may protect the foot from the ground to improve walking efficiency, elevating the heel off the ground increases the height of the wearer and may accentuate their calf muscles and create the general appearance of a longer leg. In this respect, there are many types of high-heels on the market, many of which vary in shape, size, color combination, material, and/or style. For example, high-heel styles may include the stiletto, wedge, kitten heel, cone heel, and spool heel. Each style may serve different applications depending on the social and/or cultural context of use. As an example, the fashion industry is in a continuous cycle of creating new fashion trends and apparel designs, which naturally include high-heel shoe designs. New and/or unique designs may stand out, make fashion statements, change fashion trends, and/or simply help the fashion designer sell more apparel. To this end, there have been few changes and/or improvements to the general structure of traditional high-heel shoe designs over the years.

In general, most high-heel shoes share the same general construction. For example, FIG. 1 illustrates a prior art high-heel shoe 40 that includes a lining 42 stitched or otherwise attached to an internally located insole 44 designed to provide cushioned support for the foot of the wearer. An upwardly presented opening 46 formed from the lining 42 may cooperate with the lining 42 and the insole 44 to form an enclosure for selectively receiving and retaining the foot of a wearer during use. More specifically with respect to the construction of the prior art high-heel shoe 40 illustrated in FIG. 1, the lining 42 forms a front toe box 48 positioned above a generally horizontally located and relatively cushioned base 50 that supports the pad of the wearer's foot. The platform may include an outer outsole 52 having a relatively rigid construction to reduce wear thereon as the outsole 52 interfaces with a ground 54. A heel 56 generally positions a heel section 58 of the prior art high-heel shoe 40 formed by the lining 42 and the insole 44 in an elevated position as illustrated in FIG. 1. As such, the generally horizontally positioned base 50 bends upwardly into a shank 60 that terminates into the heel section 58 approximately immediately above the supportive heel 56. As is known in the art, the heel 56 is in the form of a single straight post that tapers downwardly from the heel section 58 and terminates in a relatively rigid bottom piece 62 designed to interface with the ground 54 similar to the outsole 52. The heel 56 (and the corresponding bottom piece 62) supports the heel section 58 in the elevated position relative to the toe box 48 and/or the base 50. As such, when worn, the heel 56 elevates the wearer's heel to an elevated position relative to the ground 54 to attain the benefits mentioned above. Although, over the years, there have been few variations in the construction of the prior art high-heel shoe 40, and especially with respect to the single straight tapered post that forms the heel 56. Moreover, the single straight tapered post design of the heel 56 can also be undesirably unstable or wobbly.

Nearly half of the women in the United States wear high-heel shoes. But, wearing high-heel shoes may cause foot pain and other postural problems because the wearer's body weight may be distributed unevenly, thus placing excess stress on the ball of the foot and the forefoot. The American Podiatric Medical Association ("APMA") conducted a survey indicating that 71 percent of women who wear high-heel shoes found that high-heel shoes hurt their fee. More specifically, *The Journal Of Musculoskeletel Medicine* identified that "shoes that have inadequate cushioning and arch support and shoes that do not flex well under the heel of the foot are all culprits of heel pain". Since most high-heel shoes have inadequate cushioning and arch support, it comes as no surprise that 71 percent of wearers identify foot pain with high-heel shoes. In fact, high-heel shoe wearers are typically at higher risk of getting plantar fasciitis. Furthermore, Jayne Snyder, PT, MA, and member of the American Physical Therapy Association has said, "centering the body's weight on the ball of the foot instead of distributing it over the entire sole while shoving the toes into a narrow toe box may feel stylish, but it will likely cause posture problems and a host of other difficulties. Simply put, heels cause the neck and back to hyperextend, which causes the body to compensate by flexing and bending the spine and the hips forward. It is a constant balancing act. The muscles of the legs flex and while the curved contours of a woman's leg may look attractive, hours of this exaggerated flexing will cause fatigue."

As such, there exists, therefore, a need in the art for a high-heel shoe that includes a reinforced shoe heel having a support in the form of one of a plurality of alphanumeric characters or symbols and an integral angled platform having a relatively rigid support plate imbedded thereon and a pair of stabilizing rods integrated therewith to provide enhanced stability and support. The present invention fulfills these needs and provides further related advantages.

SUMMARY OF THE INVENTION

One embodiment of a reinforced shoe heel as disclosed herein includes an angled platform having a surface area for supporting a heel section of a shoe, a core including a plate and at least one reinforcement rod extending therefrom, and a support (e.g., made from a steel material, an aluminum material, a titanium material, or a plastic material) coupled with and extending below the angled platform. The plate may have a size and shape for select imbedded seated reception on a top surface of the angled platform. Additionally, the plate may include a plurality of heel section mounting apertures for attachment to the heel section of the shoe. In one embodiment, the plurality of heel section mounting apertures may be generally equidistantly positioned on opposite sides of a longitudinal axis and may be generally equidistantly positioned on opposite sides of a lateral axis to provide symmetry. The support may be positioned in relation relative to the core to selectively receive the at least one reinforcement rod projecting from the plate. The reinforcement rod then cooperates with the top-mounted plate to increase the relative structural rigidity of the reinforced shoe heel to generally relatively resist torsion, compressive, and shear stresses during use when attached to the shoe. Here, the angled platform and the support may include a unitary structure and a surface area of the plate may include an oval surface area relatively smaller than an oval surface area of the angled platform.

In one embodiment, the at least one reinforcement rod may include a pair of reinforcement rods, i.e., a first relatively longer reinforcement rod and a second relatively shorter reinforcement rod. Each of the first relatively longer reinforcement rod and the second relatively shorter reinforcement rod may extend inwardly toward one another at an angle. More specifically, the first relatively longer reinforcement rod may extend downwardly and forwardly toward the second relatively shorter reinforcement rod and the second relatively shorter reinforcement rod may extend downwardly and rearwardly toward an approximate midpoint of the first relatively longer reinforcement rod. Here, the plate, the first relatively longer reinforcement rod, and the second relatively shorter reinforcement rod may be positioned relative to one another in a general triangular truss-based configuration to provide enhanced structural rigidity to the reinforced shoe heel. To accommodate the first relatively longer reinforcement rod and the second relatively shorter reinforcement rod, the support may include a pair of rod receiving channels extending into the support from a top surface of the angled platform. Here, of course, the pair of rod receiving channels have a respective size and shape for select slide-in reception of one of the first relatively longer reinforcement rod or the second relatively shorter reinforcement rod. Similarly, the plate may include a respective set of rod receiving apertures generally concentrically aligned with the pair of rod receiving channels formed in the top surface of the angled platform and configured for reception of the first relatively longer reinforcement rod and the second relatively shorter reinforcement rod. In one embodiment, the first relatively longer reinforcement rod may have a cross-sectional shape different than the second relatively shorter reinforcement rod.

In another embodiment as disclosed herein, a high-heel shoe may include a lining coupled with an insole that generally forms a toe box at a front of the high-heel shoe and a heel at a rear of the high-heel shoe. Such a high-heel shoe may further include a generally horizontally positioned base formed underneath the toe box, wherein the base transitions into an upwardly extending shank that terminates into the heel at a rear of the high-heel shoe. As such, the heel is located in a relatively higher position than the toe box. Alternatively, the high-heel support may extend about 30%-50% of the way from the heel to the toe box. The high-heel support itself may be formed of an alphanumeric character generally positioned up underneath and supporting the relatively higher positioned heel.

In general, the alphanumeric character may include an English-language alphanumeric character, a Latin-based alphanumeric character, a Japanese-language alphanumeric character, a Chinese-language alphanumeric character, a symbol, or a shape. More specifically, the English-language alphanumeric character may be selected from the group consisting of 0, 1, 2, 3, 4, 5, 6, 7, 8, 9, A, a, B, b, C, c, D, d, E, e, F, f, G, g, H, h, I, i, J, j, K, k, L, l, M, m, N, n, O, o, P, p, Q, q, R, r, S, s, T, t, U, u, V, v, W, w, X, x, Y, y, Z, and z; the symbol may be selected from the group consisting of @, *, #, +, $, &, ?, and {; and the shape may be a polygon.

In another aspect of this embodiment, the high-heel support may include an angled platform having an upwardly presented surface area supportive of the heel and integrated with a core. The core may include a support plate embedded on the angled platform and sandwiched between the angled platform and the heel. While the angled platform may support the heel, the angled support platform and/or the support plate may also extend up underneath the heel, the shank, and/or the toe box. The core may include a pair of reinforcement rods generally extending downwardly and inwardly relative to one another from the support plate and into the alphanumeric character. A plurality of screws may extend through the heel and into the high-heel support to draw the heel and the high-heel support into engagement with one another. Here, the screws may include a threaded screw, bolt, or non-threaded nail.

In another aspect of the embodiments disclosed herein, a process for manufacturing a high-heel shoe incorporating a reinforced shoe heel includes forming a negative in a mold cavity having a shape of the reinforced shoe heel, floating at least one channel forming rod into the negative in the mold cavity, closing the mold cavity around the at least one channel forming rod, filling the mold cavity with a fluid molding material, and curing the fluid molding material in the mold cavity into a relatively rigid integral support platform and heel support having at least one rod receiving channel formed therein. Depending on the fluid molding material, temperature of the manufacturing facility, and temperature responsiveness of the mold and/or fluid molding material, the curing step may include the step of cooling the mold cavity for approximately 80-100 minutes.

More specifically, the process may include the step of 3D printing a mold insert in the shape of the reinforced shoe heel. Here, the mold insert may include at least a pair of extensions having a size and shape for forming a channel forming extension in the negative for selectively receiving and retaining the at least one channel forming rod during the floating step. In another aspect of this step, the mold insert may further include a bleed extension having a length extending out from within the mold cavity during the forming step. As such, the at least one channel forming rod within the negative of the mold cavity may obstruct the resin molding material during the filling step, thereby forming a void that forms the rod receiving channel within an interior of the integral support platform and the heel support. In this respect, the floating step may include the step of sandwiching the at least one channel forming rod between opposite sides of the mold cavity.

In another aspect of the manufacturing process, a relatively rigid support plate may be embedded into a top surface of the support platform. Here, such an embedding step may include the step of aligning at least a pair of rod receiving apertures in the support plate with at least a pair of rod receiving channels formed in the support platform and the heel support. This way, a reinforcement rod may be inserted into each of the rod receiving apertures and each of the corresponding rod receiving channels. The reinforcement rods may then be secured to the support plate by a weld, an adhesive, etc. The shoe sole may then be attached to the reinforced heel by threading screws through the shoe sole and into the reinforced shoe heel, thereby drawing the reinforced shoe heel into engagement with the shoe sole.

Other features and advantages of the present invention will become apparent from the following more detailed description, when taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
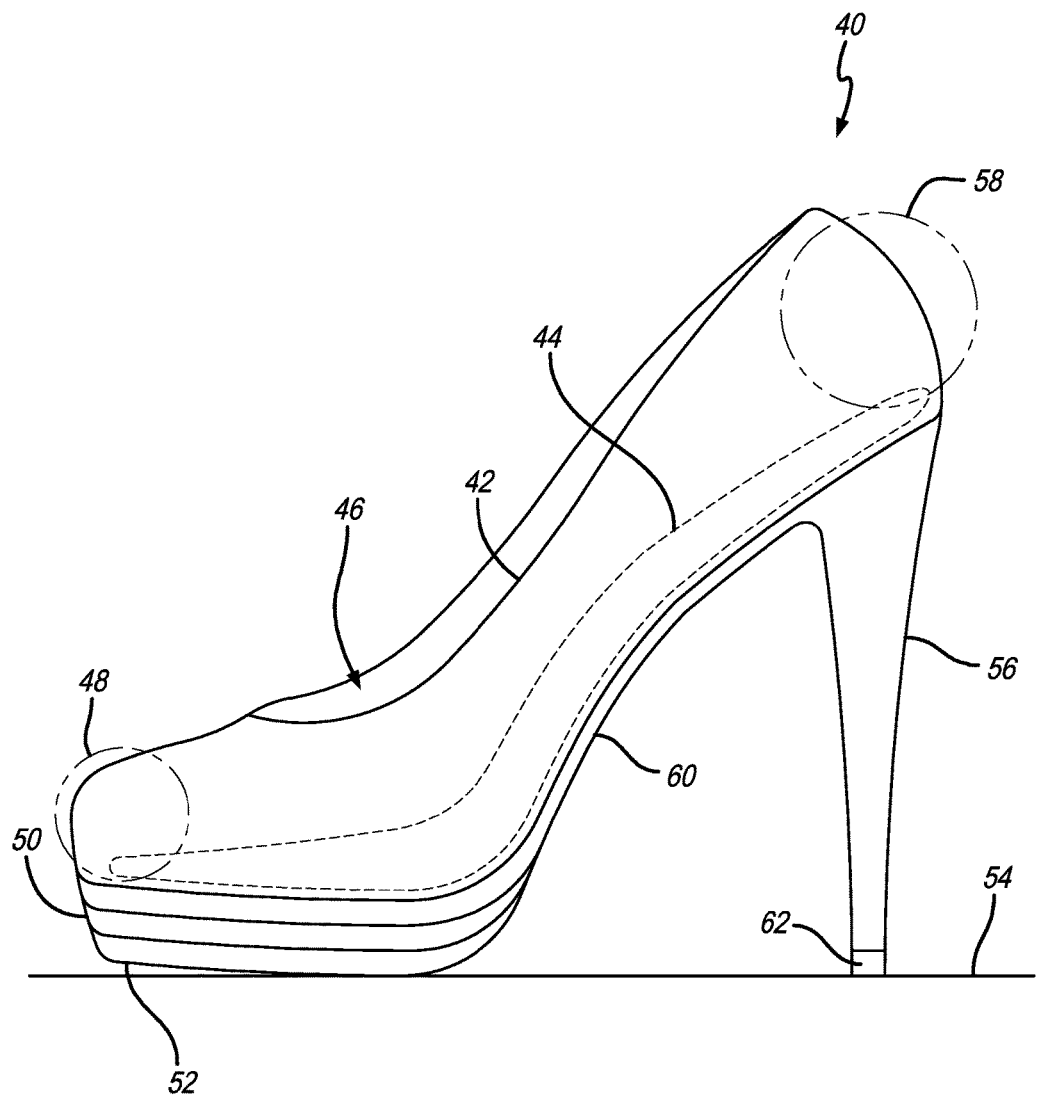
FIG. 1 is a side view of a prior art high-heel shoe including a prior art heel.
Figure 2:
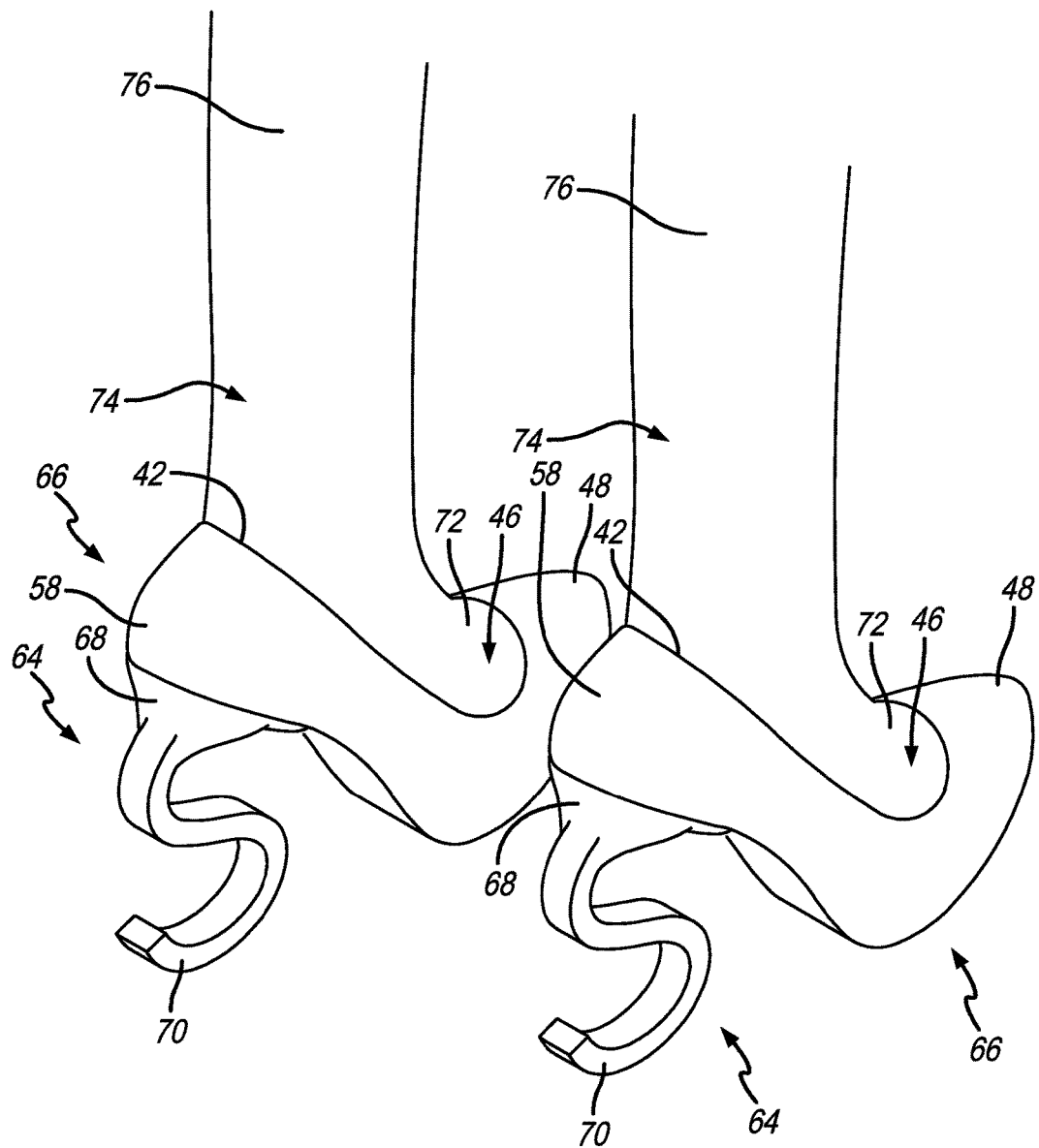
FIG. 2 is an environmental perspective view of a person wearing a pair of high-heel shoes each incorporating a reinforced shoe heel in the shape of the letter "S", as disclosed herein.
Figure 3:
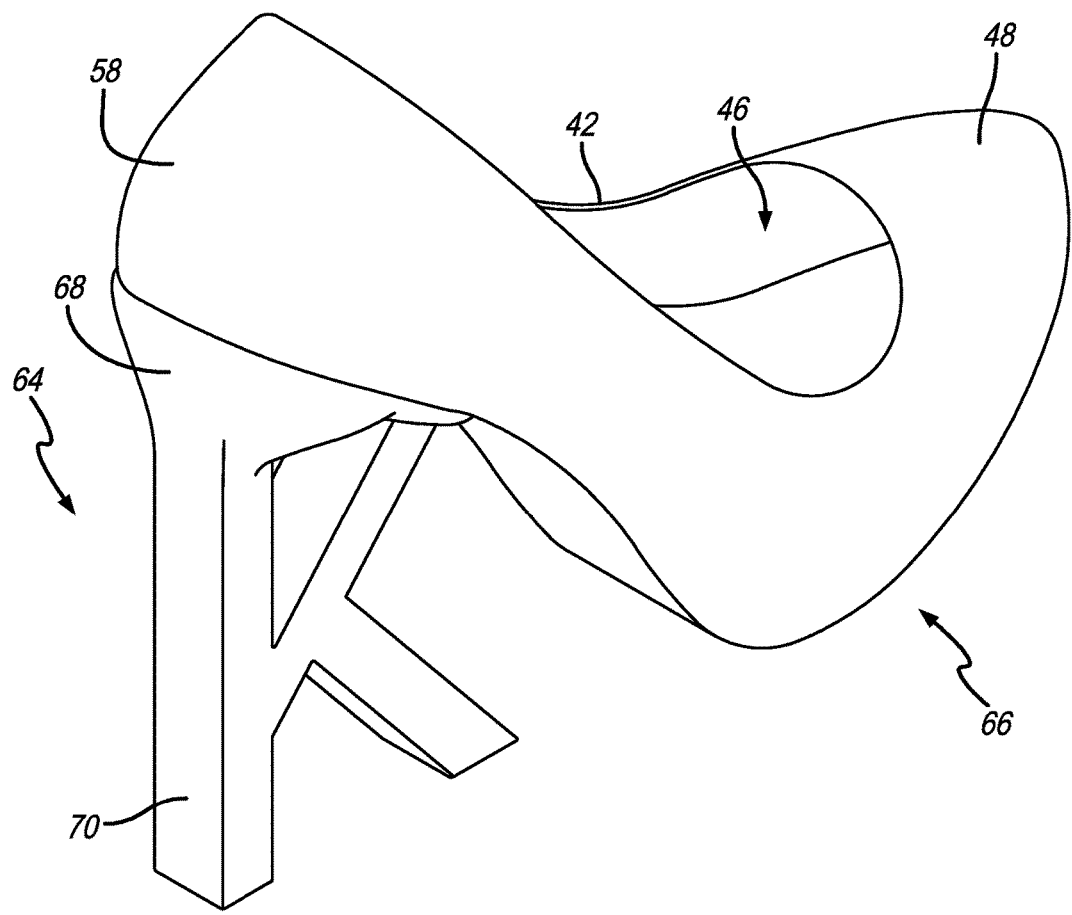
FIG. 3 is an enlarged perspective view of the high-heel shoe incorporating the reinforced shoe heel in the shape of the letter "K"
Figure 12:
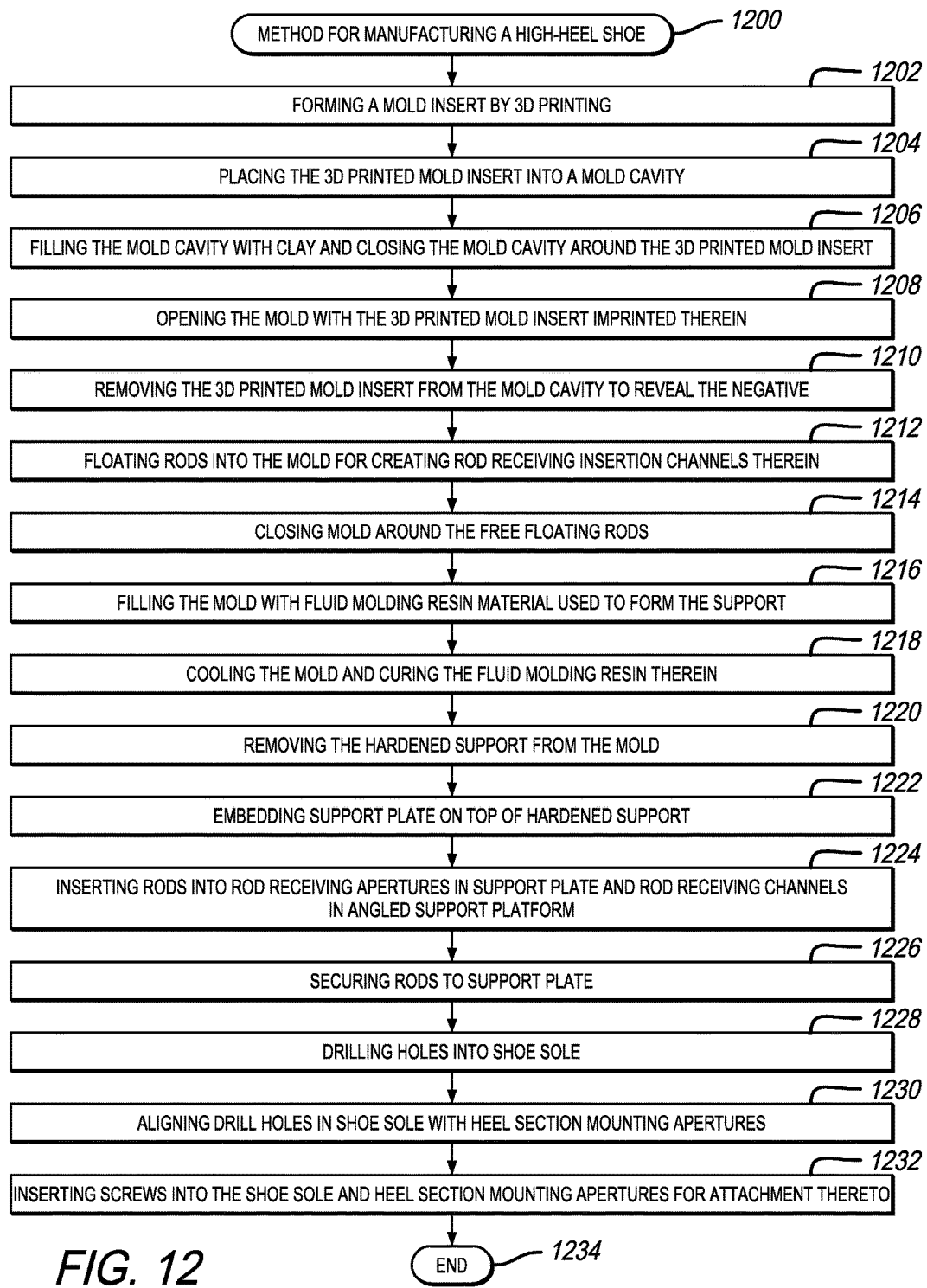
FIG. 12 is a flowchart illustrating one embodiment for a method for manufacturing a high-heel shoe incorporating the reinforced shoe heel as disclosed herein.

As shown in the exemplary drawings for purposes of illustration, the present invention for a reinforced shoe heel is referenced herein with respect to numeral 64 in FIGS. 2-4, 9-10, and 26 and the method for manufacturing shoes incorporating the same is referenced herein with respect to the process (1200) illustrated in FIG. 12. More specifically, FIGS. 2 and 3 illustrate two embodiments of the reinforced shoe heel 64 integrated into a pair of shoes 66. As shown, the reinforced shoe heel 64 generally includes an angled support platform 68 (positioned up underneath and providing platform support for the heel section 58) and a downwardly projecting support 70 that generally elevates the heel section 58 above the toe box 48 as mentioned above with respect to FIG. 1. In this respect, the support 70 is S-shaped in FIG. 2 and K-shaped in FIG. 3. Accordingly, when worn as shown in FIG. 2, a foot 72 of the wearer may slide into the opening 46 formed with the lining 42 such that the wearer's toes (unnumbered) slide into the toe box 48 and the wearer's heels (also unnumbered) remain in the elevated position above the angled support platform 68. This may accentuate the calves 74 and/or the legs 76 of the wearer, as mentioned above.

FIG. 2 illustrates one embodiment of the support 70 formed into the shape of the letter "S". Although, in other embodiments, the support 70 may be formed into a different letter, such as the letter "K" (e.g., as illustrated in FIGS. 3-5, 9-10, 21-23, and 25-26), the letter "R" (e.g., as illustrated in FIG. 6), or the letter "M" (e.g., as illustrated in FIG. 7). Of course, the support 70 could be virtually any alphanumeric character, including any number (e.g., 0, 1, 2, 3, 4, 5, 6, 7, 8, 9), any capital or lowercase English language letter (e.g., A, a, B, b, C, c, D, d, E, e, F, f, G, g, H, h, I, i, J, j, K, k, L, l, M, m, N, n, O, o, P, p, Q, q, R, r, S, s, T, t, U, u, V, v, W, w, X, x, Y, y, Z, z), any non-English language alphanumeric character (e.g., Arabic characters, Bengali characters, Chinese characters, Japanese characters, Russian characters, Hindi characters, Latin-based characters, etc.), any symbol (e.g., @, *, #, +, $, &, {, etc.), any combination of alphanumeric characters, symbols, and/or shapes (e.g., to spell a word, create a logo, or show a phrase), any shape (e.g., five-pointed star, tree, wagon wheel, etc.), different geometries (e.g., various polygons), other characters such as animals (e.g., dogs, cats, horses, rabbits, lions, turkeys, and birds), symbols (e.g., hearts, flowers, suns, moons, trees, stars, a lightning bolt, a tornado, a football, a soccer ball, baseball, basketball, hockey stick, castle, Santa Clause, a Christmas Tree, leprechaun, Jesus, mother goose, humpty dumpty, witch, broomstick, and astrology horoscope symbols), or other characters or symbols known in the art. Additionally, the font, size, and general structure of the support 70 may vary from embodiment to embodiment, as needed and/or desired to achieve the design aesthetics and or functionality. For example, in embodiments wherein the support 70 is an alphanumeric character, the support 70 may include additional detailing such as underlining, italicization, bolding, etc. The thickness of the support 70 in the orthogonal plane may also be any thickness known in the art to provide the desired stability and/or balance when the support 70 is attached underneath the heel section 58.

In another example, in embodiments wherein the support 70 is an alphanumeric character, the alphanumeric character may be set in bubble letter font (i.e., a font in which the letters or numbers appear relatively rounded and/or bulging). In this embodiment, the support 70 may be made of a relatively malleable material (e.g., cork or jelly-like substance), which may allow the heel to cushion compress when under a compressive load (e.g., taking a step) and then expand when pressure on the heel is released (e.g., raising the foot off the ground after taking a step). Such an embodiment may have additional benefits related to alleviating foot and leg pain.

The font of the support 70 may include, but is not necessarily limited to, Times New Roman, Arial, Adobe Jenson, Albertus, Aldus, Alexandria, Algerian, American Typewriter, Antigua, Aster, Aurora, News 706, Baskerville, Belwe Roman, Bembo, Berkeley Old Style, Bernhard Modern, Bodoni, Bauer Bodoni, Book Antiqua, Bookman, Bubble, Bulmer, Caledonia, Californian FB, Calisto MT, Cambria, Capitals, Cartier, Caslon, Wyld, Caslon Antique/Fifteenth Century, Catull, Centaur, Century Old Style, Century Schoolbook, New Century Schoolbook, Century Schoolbook Infant, Charis SIL, Charter (typeface), Cheltenham, Clearface, Cochin, Colonna, Computer Modern, Concrete Roman, Constantia, Constructium, Cooper Black, Copperplate Gothic, Corona, DejaVu Serif, Didot, Dolce Vida, Droid Serif, Elephant, Emerson, Excelsior, Fairfield, FF Scala, Footlight, FreeSerif, Friz Quadrata, Futura, Garamond, Gentium, Georgia, Gloucester, Goudy Old Style/Goudy, Granjon, High Tower Text, Hoefler Text, Imprint, Ionic No. 5, ITC Benguiat, Lexicon, Liberation Serif, Lucida Bright, Melior, Memphis, Miller, Modern, Mona Lisa, Mrs Eaves, MS Serif, Nimbus Roman, Nonstop, Palatino, Book Antiqua, Perpetua, Plantin, Playbill, Primer, Renault, Requiem, Sistina, Souvenir, Sylfaen, Times New Roman, Times (Linotype's version of Times New Roman), Torino, Trajan, Trinité, Trump Mediaeval, Utopia, Vera Serif, Wide Windsor, Alexandria, American Typewriter, Archer, Athens, Candida, Cholla Slab, City, Clarendon, Concrete Roman, Courier, Egyptienne, Lexia, Memphis, Nilland, Roboto Slab, Rockwell, Schadow, Serifa, Skeleton Antique, Sreda, Swift, Tower, Agency FB, Antique Olive, Arial, Avant Garde Gothic, Avenir, Bank Gothic, Bauhaus, Bell Centennial, Bell Gothic, Benguiat Gothic, Berlin Sans, Brandon Grotesque, Calibri, Century Gothic, Comic Sans, Compacta, Corbel, DejaVu Sans, Folio, Franklin Gothic, Futura, Gotham, Handel Gothic, Helvetica, Helvetica Neue, Impact, Liberation Sans, Lucida Sans, Lucida Grande, Microgramma, News Gothic, Nimbus Sans L, Open Sans, Optima, Roboto, Rotis Sans, Tahoma, Tiresias, Trade Gothic, Trebuchet MS, Twentieth Century, Ubuntu, Vera Sans, Verdana, Fixed, Letter Gothic, Liberation Mono, Lucida Console, Brush, Balloon, Brush Script, Mistral, Papyrus, Calligraphic, American Scribe, Cézanne, Chalkboard, Comic Sans MS, Dom Casual, Kristen, Coronet, Curlz, Gravura, Lucida Blackletter, Old English Text, Aharoni (including Hebrew script), Aparajita (Angika, Bhojpuri, Bodo and other Indian languages), Arial (Used in English, Arabic, Hebrew and other languages), Calibri (Greek), Chandas (Devanagari), Gadugi (Used by the American/Canadian Blackfoot tribe, and for the language called Carrier, and used by the Native American tribe of the Cherokee and for other languages), Grecs du roi (Greek), Hanacaraka (traditional Javanese script), Japanese Gothic, Jomolhari (Tibetan script), Kiran (Devanagari), Kochi, Koren (Hebrew), Kruti Dev (Devanagari), Malgun Gothic (Korean sans-serif), Meiryo (Japanese sans-serif gothic typeface), Mincho, Ming, Mona (Japanese), Nastaliq Navees, Perpetua Greek, Porson (Greek), Shruti (Gujarati), SimSun, Sylfaen (a multi-script serif font family, for various non-Latin scripts and is for the languages Armenian and Georgian), Tengwar, Tibetan Machine Uni, Georgia, Lucida Grande, MS Gothic, Verdana, Blackboard bold, Bookshelf Symbol, Cambria, Cooper Black, Stencil, Umbra, Westminster, Willow, Windsor.

Figure 4:
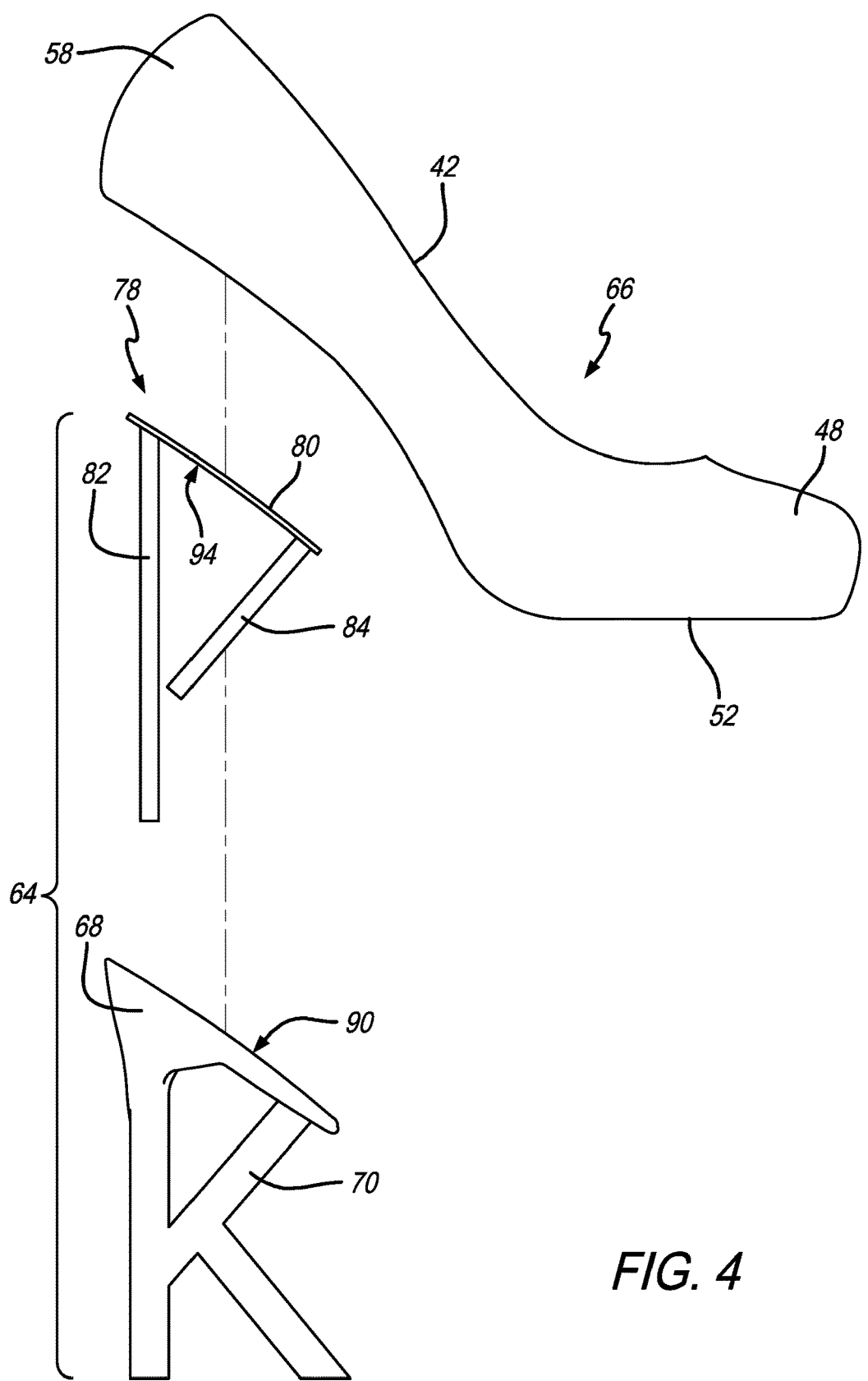
FIG. 4 is an exploded side view of the high-heel shoe of FIG. 3, further illustrating an internal support core having a support plate and a pair of rods configured for engagement with the K-shaped support.

FIG. 4 is an exploded perspective view generally illustrating additional internal construction of the reinforced shoe heel 64 relative to the shoe 66. More specifically, the angled support platform 68 and the support 70 may be configured to selectively receive a support core 78 that includes a support plate 80 (e.g., made from metal, steel, aluminum, titanium, plastic, or another relatively rigid material known in the art) and a pair of support rods that may include a first longer rod 82 relatively longer than a second shorter rod 84. Each of the longer rod 82 and the shorter rod 84 may have a size and shape configured for select slide-in reception within a respective set of rod receiving channels 86, 88 formed in a top surface 90 of the angled support platform 68 (e.g., as shown best in FIGS. 5-7 with respect to the support 70 in the shape of the letter "K" (FIG. 5), the letter "R" (FIG. 6), and the letter "M" (FIG. 7)).

The support plate 80 is designed for seated reception on the angled support platform 68 and may include a surface area commensurate in size with the surface area of the angled support platform 68. For example, in one embodiment, the support plate 80 may be a curved or oval shaped plate 80 having a size and shape to be imbedded on the angled support platform 68 having a general curved or oval shape designed to track the size and shape of the wearer's heel. Although, in other embodiments, the support plate 80 may have a surface area relatively smaller than the surface area of the angled support platform 68 (e.g., as shown in FIGS. 9 and 24-26) so the support plate 80 remains hidden when sandwiched between the heel section 58 of the shoe 66 and the angled support platform 68, when the high-heel shoe is fully assembled. Additionally, the support plate 80 may also be a different shape, such as rectangular and may include one or more fillets or chamfers. Furthermore, the support plate 80 may be made of metal, plastic, or any other rigid material known in the art.

While each of the angled support platform 68 and the support plate 80 are illustrated herein extending up underneath the heel section 58, in alternative embodiments, the angled support platform 68 and/or the support plate 80 may extend further down and away from the heel section 58. For example, in one embodiment, one or both of the angled support platform 68 and the support plate 80 may extend in and along all or a portion of the shank 60 (FIG. 1). In other embodiments, one or both of the angled support platform 68 and the support plate 80 may form part or all of the underside of the shoe 66, i.e., extending from the heel section 58 all the way down the shank 60, and to the front of the toe box 48.

Here, instead of having a separate base 50 separating the base 50 from the heel section 58, the shoe 66 could include a single seamless support in the form of the angled support platform 68 and/or the support plate 80. In other words, the angled support platform 68 and/or the support plate 80 would extend from the heel section 58 all the way down the shoe 66, instead of terminating before, at, or near the shank 60. Extending the angled support platform 68 and the support plate 80 further down the length of the shoe 66, away from the heel section 58, and toward the toe box 48 (e.g., along the shank 60) may shift part of the weight of the wearer from the heel section 58 to the arch of the foot 72 for better weight distribution, thereby providing additional support and comfort. In one embodiment, the support platform 68 and the support plate 80 may extend approximately 30% to 50% of the distance from the heel section 58 to the toe box 48.

Figure 8:
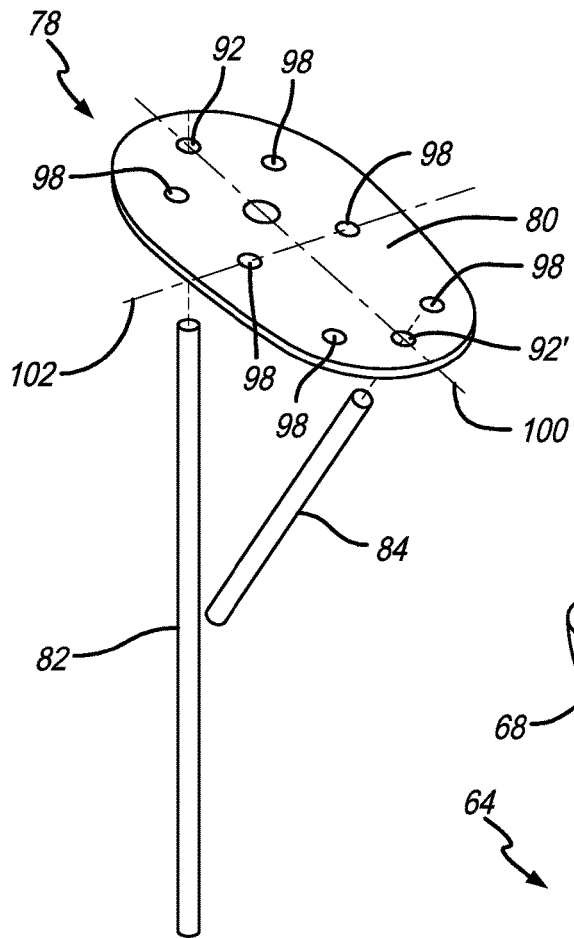
FIG. 8 is an exploded perspective view of the support core, more specifically illustrating the relative orientation of the angled support plate relative to the pair of rods.

FIG. 8 is an exploded perspective view of the support core 78, further illustrating the support plate 80 in exploded relation relative to the rods 82, 84. While the embodiments disclosed herein disclose the use of two of the rods 82, 84, the reinforced shoe heel 64 may include as few as none of the rods 82, 84, one of the rods 82 or 84, or multiple of the rods 82, 84 (e.g., two or more). As shown, the support plate 80 includes a pair of rod receiving apertures 92 having a size and shape for select slide-in reception of one of the rods 82, 84. In the embodiment illustrated in FIG. 8, the rod receiving aperture 92 may be configured for select slide-in reception of the longer rod 82 and the rod receiving aperture 92' may be configured for select slide-in reception of the shorter rod 84. Here, the rod receiving apertures 92, 92' may be the same size and/or the rod receiving apertures 92, 92' may be different sizes and/or shapes. For example, in one embodiment, the rod receiving apertures 92, 92' may both be circular, except that the rod receiving aperture 92 may have a relatively wider diameter to accommodate a relatively wider diameter longer rod 82. In other embodiments, the rod receiving apertures 92, 92' may be different shapes (e.g., rectangular, hexagonal, octagonal, or another cross sectional shape), and the respective rods 82, 84 may be commensurately shaped for slide-through reception therein. For example, the rod receiving aperture 92 may have a circular cross-section and the rod receiving aperture 92' may have a rectangular cross-section.

Figure 5:
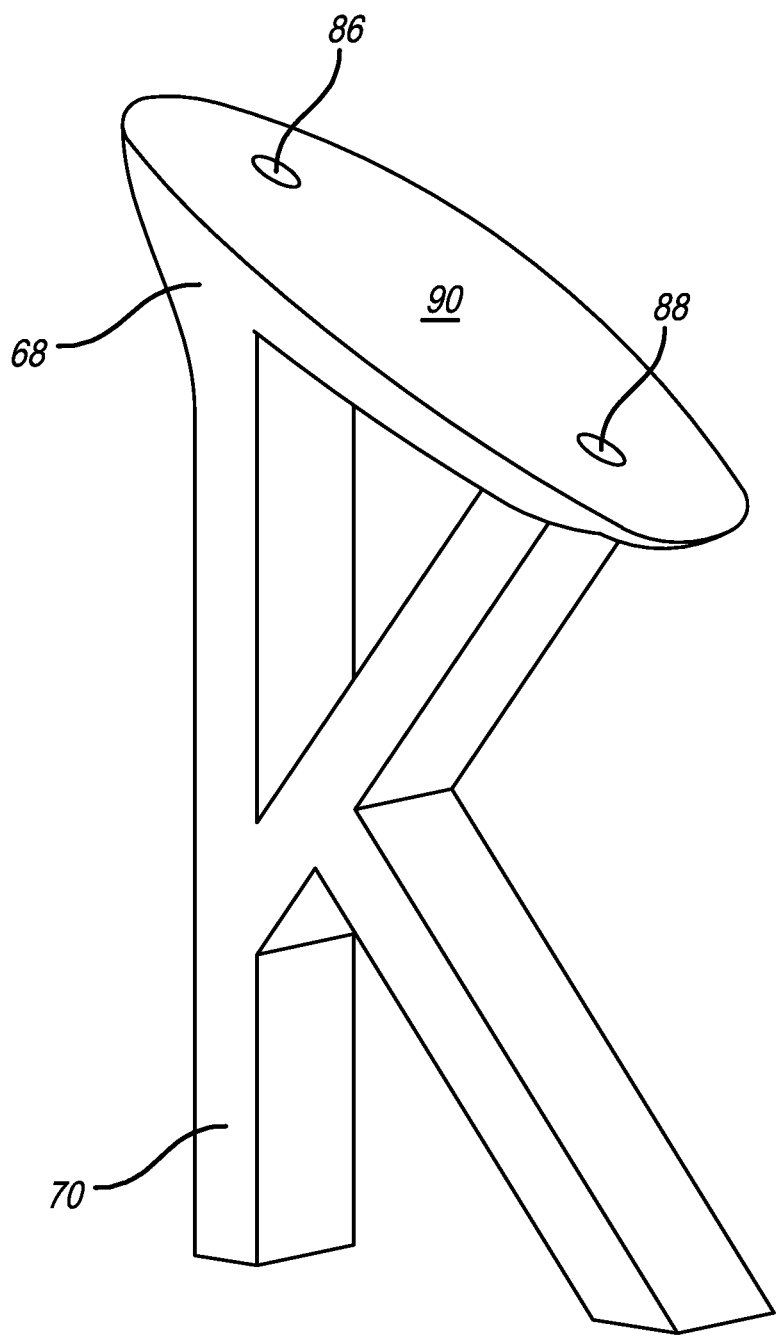
FIG. 5 is a perspective view of the K-shaped support, further illustrating a pair of rod receiving channels formed into a top surface of the angled support platform.
Figure 6:
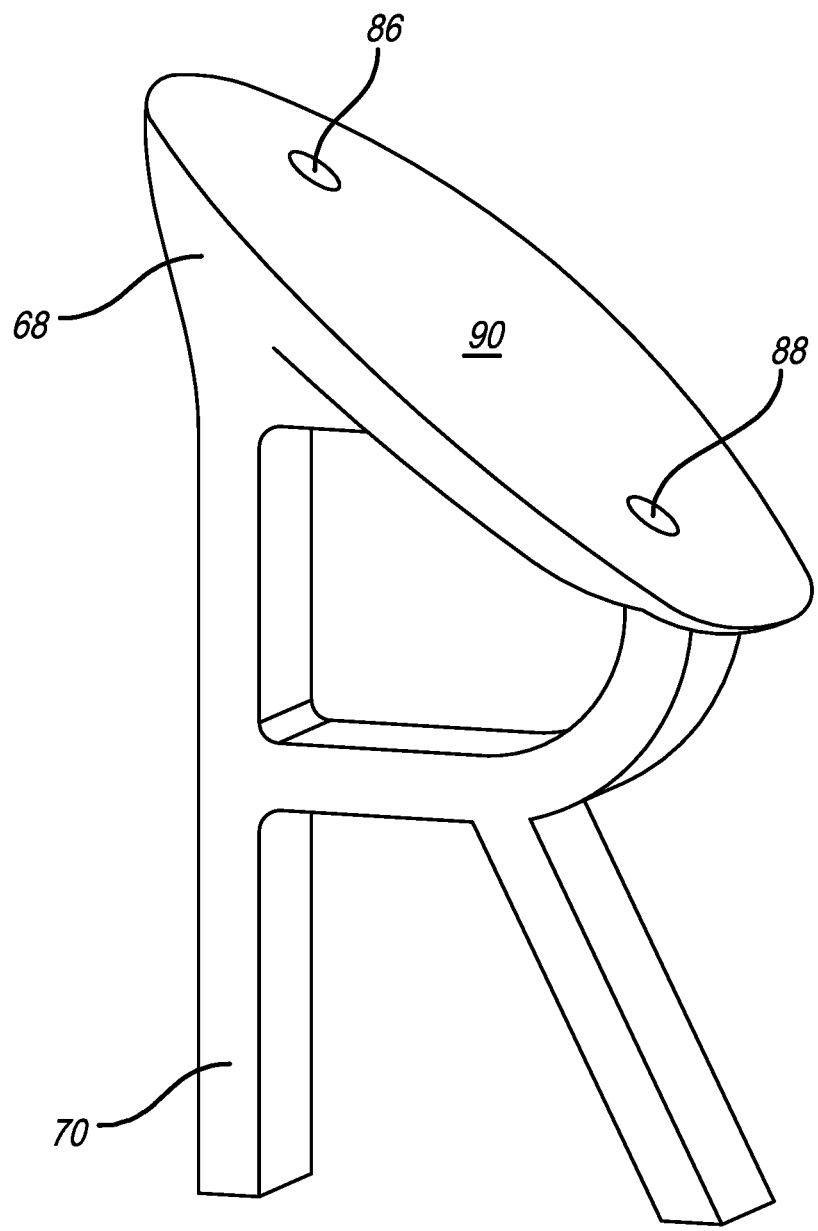
FIG. 6 is a perspective view of an R-shaped support similar to FIG. 5.
Figure 7:
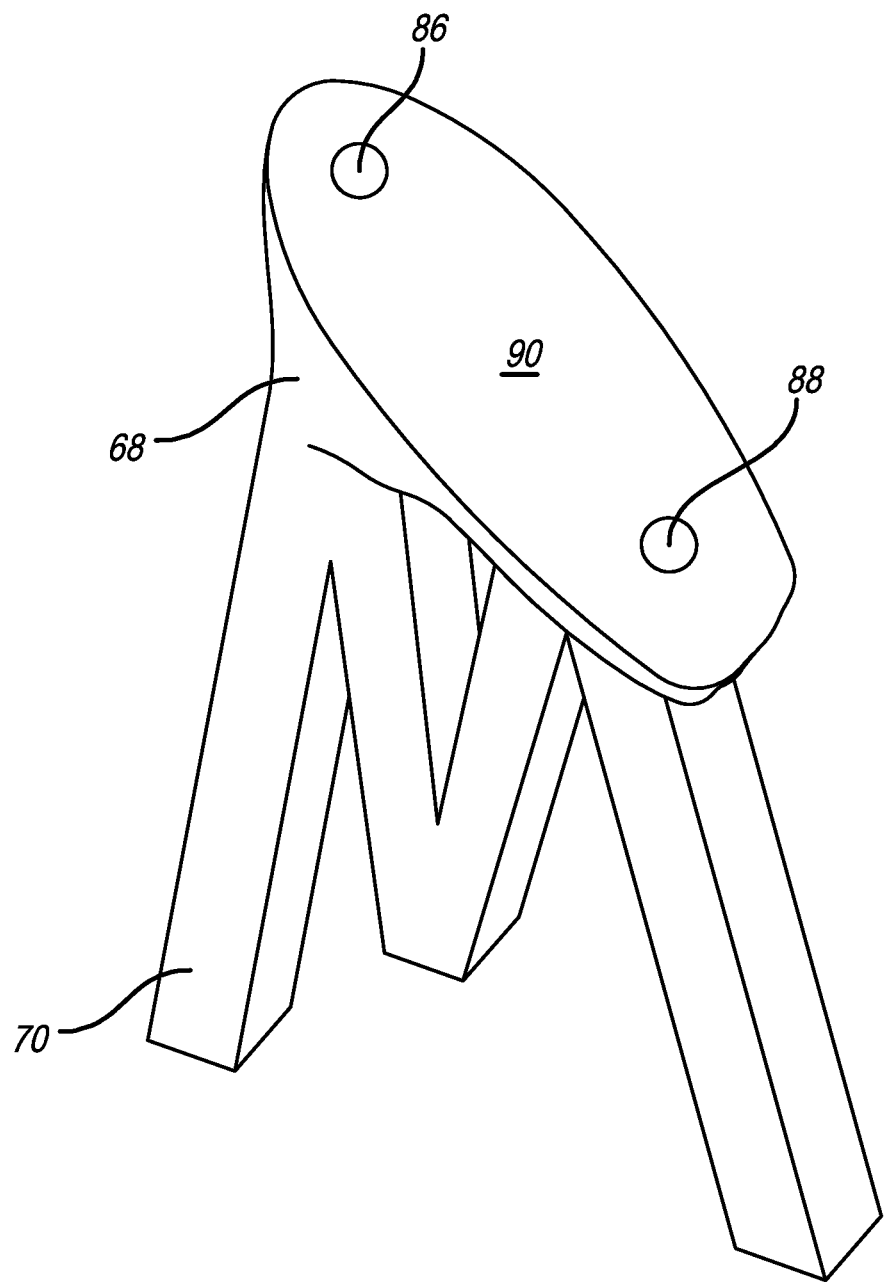
FIG. 7 is a perspective view of an M-shaped support similar to FIGS. 5-6.

Moreover, the rod receiving apertures 92, 92' facilitate pass-through reception of the rods 82, 84 so the rods 82, 84 can eventually selectively slidably engage the rod receiving channels 86, 88, as illustrated above, e.g., with respect to FIGS. 5-7. To the extent the rod receiving apertures 92, 92' and/or the rods 82, 84 vary in size (e.g., width) or shape (e.g., circular vs. round cross-section), the rod receiving channels 86, 88 should be of similar size and shape to facilitate select slide-in reception.

As illustrated in FIGS. 4, 8, 10-11, and 25, the rods 82, 84 are of a generally cylindrical shape, which may tend to prevent twisting and/or rotation of the support 70 relative to the support core 78 once the rods 82, 84 are inserted therein. Additionally, the rods 82, 84 may be made of from metal (e.g., steel, aluminum, titanium, etc.), hard plastic, or some other generally rigid material resistant to deformation when loaded under compressive and/or shear stresses as a result of carrying the weight of the wearer (e.g., as illustrated in FIG. 2).

Figure 9:
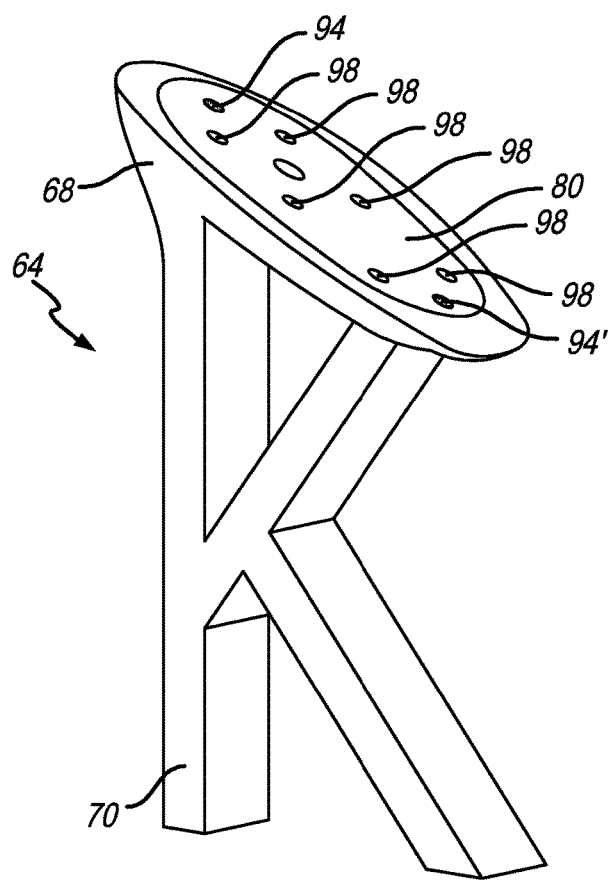
FIG. 9 is a perspective view of the K-shaped support of FIG. 5 assembled with the support core of FIG. 8 to form the reinforced shoe heel.
Figure 10:
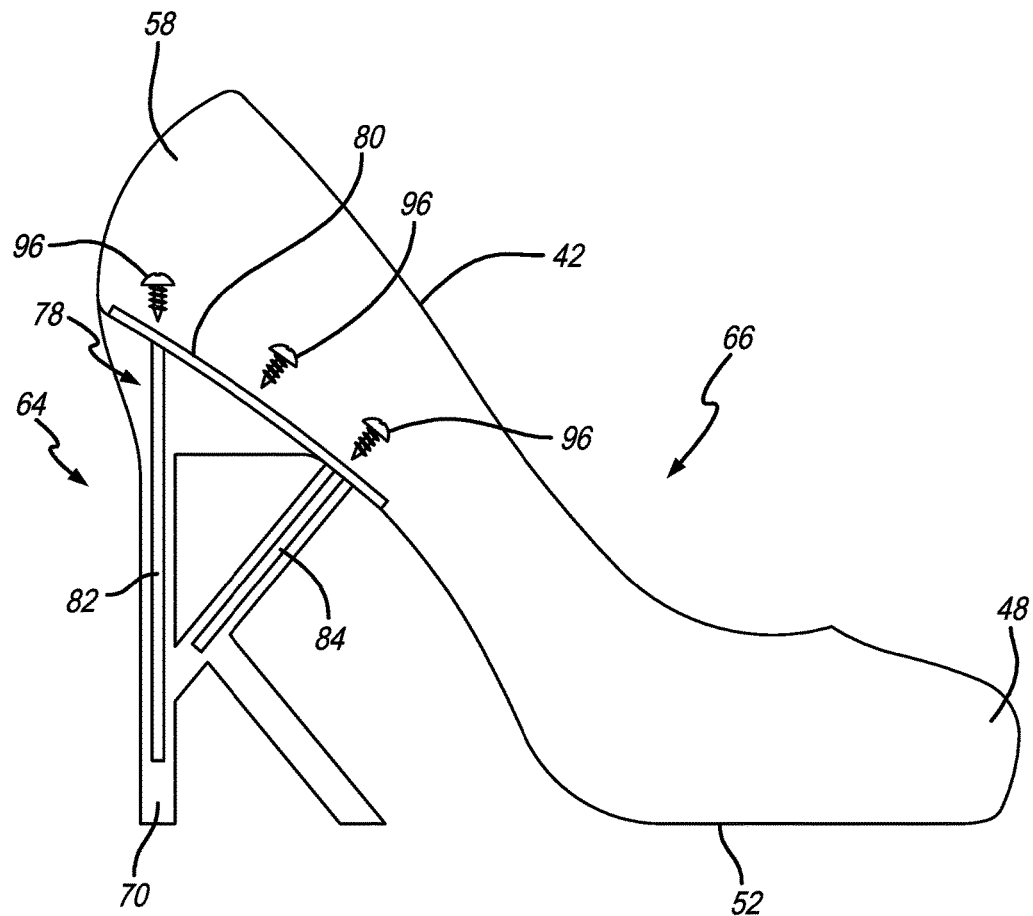
FIG. 10 is a partial cutaway side view illustrating attachment of the assembled reinforced shoe heel with the shoe by way of a set of screws illustrated in exploded relation relative thereto.
Figure 25:
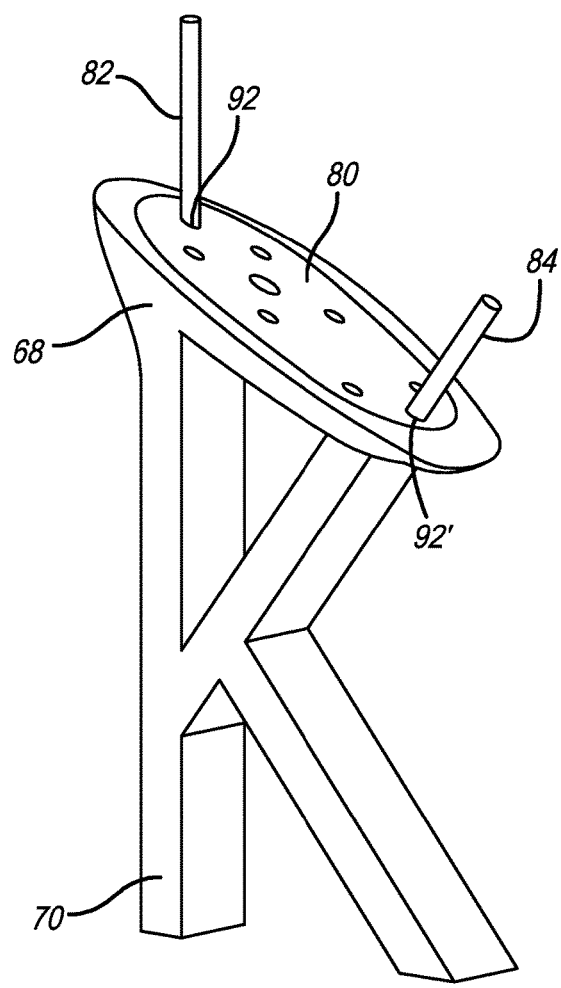
FIG. 25 is a perspective view illustrating insertion of the longer rod and the shorter rod into the support platform and the K-shaped support.

FIG. 9 illustrates connection of the support plate 80 to the angled support platform 68. Here, and as described in more detail below, the support plate 80 may generally imbed upon the angled support platform 68 such that the rod receiving apertures 92, 92' align with the rod receiving channels 86, 88 in the angled support platform 68. Then, each of the rods 82, 84 may be inserted through the respective rod receiving aperture 92, 92' in the support plate 80 and into a respective rod receiving channel 86, 88 (e.g., as illustrated in FIG. 25). Thereafter, the rods 82, 84 may be secured to the support plate 80 by an adhesive (e.g., glue), weld, clamp, friction (e.g., press-fit engagement) or some other attachment mechanism known in the art to secure (e.g., permanently or otherwise), e.g., one piece of metal or plastic to another. Alternatively, the rods 82, 84 may float inside the support 70 alone (i.e., without the support plate 80) or the rods 82, 84 may float inside the support 70 proximate, but not connected to, the support plate 80. The full assembly of the reinforced shoe heel 64 illustrated in FIG. 9 show the rod receiving apertures 92, 92' (e.g., illustrated in FIG. 8) as a pair of weld points 94, 94' as a result of insertion of the respective rods 86, 88 into each of the rod receiving apertures 92, 92' and welded attachment thereto.

The assembled reinforced shoe heel 64 is then attached to the heel section 58 by a plurality of screws 96 (FIG. 10) having a size and shape for select engagement with a set of heel section mounting apertures 98 formed from the support plate 80 (FIGS. 8-9). Here, the threads of the screws 96 may threadingly engage the respective heel section mounting aperture 98 and extend therethrough for threaded engagement with the angled support platform 68. As such, the screws 96 may pull the angled support platform 68 into engagement with the heel section 58 to sandwich the support plate 80 therebetween. Here, the support plate 80 may reside flush against the bottom of the heel section 58 and the top surface 90 of the angled support platform 68. Although, in other embodiments, the screws 96 may include other attachment mechanisms known in the art, such as bolts, nails, rivets, adhesive (e.g., glue or tape), Velcro, etc., to accomplish the same.

While FIGS. 8-9 illustrate that the support plate 80 include six of the heel section mounting apertures 98 generally positioned equidistantly about the surface of the support plate 80, the quantity and/or location of the heel section mounting apertures 98 may vary from embodiment-to-embodiment. For example, the support plate 80 may include as few as none or two of the heel section mounting apertures 98, or the support plate 80 may include more than six of the heel section mounting apertures 98. Additionally, FIGS. 8-9 illustrate that the heel section mounting apertures 98 are positioned generally equidistantly on opposite sides of a longitudinal axis 100 (i.e., three of the heel section mounting apertures 98 on each side) and equidistantly on each side of a lateral axis 102 (i.e., two of the heel section mounting apertures 98 on each side and two split down the middle of the lateral axis 102). Although, in alternative embodiments, the heel section mounting apertures 98 do not necessarily need to be equidistantly positioned relative to either of the longitudinal axis 100 or the lateral axis 102. Rather, the heel section mounting apertures 98 may be selectively positioned along the surface of the support plate 80 as needed and/or desired, such as to provide maximum support for the reinforced shoe heel 64 when attached to the shoe 66. For example, multiple of the heel section mounting apertures 98 positioned at relatively high-stress or impact areas (regardless of symmetry) may tend to better prevent rotation of the reinforced shoe heel 64 relative to the heel section 58 than if the support plate 80 included only one of the heel section mounting apertures 98.

More specifically, each of the heel section mounting apertures 98 may be positioned approximately 50% of the way between either of the longitudinal axis 100 or the lateral axis 102 and the respective edge of the support plate 80. In an alternative embodiment, the heel section mounting apertures 98 may be positioned approximately 75% of the way between either of the longitudinal axis 100 or the lateral axis 102 and the respective edge of the support plate 80. In another alternative embodiment, the heel section mounting apertures 98 may be positioned approximately 80%-90% of the way between either of the longitudinal axis 100 or the lateral axis 102 and the respective edge of the support plate 80. In these latter embodiments, it may be possible to add more of the heel section mounting apertures 98 (e.g., at intervals of 60% and 80% of the way between either of the longitudinal axis 100 or the lateral axis 102 and the respective edge of the support plate 80).

Figure 11:
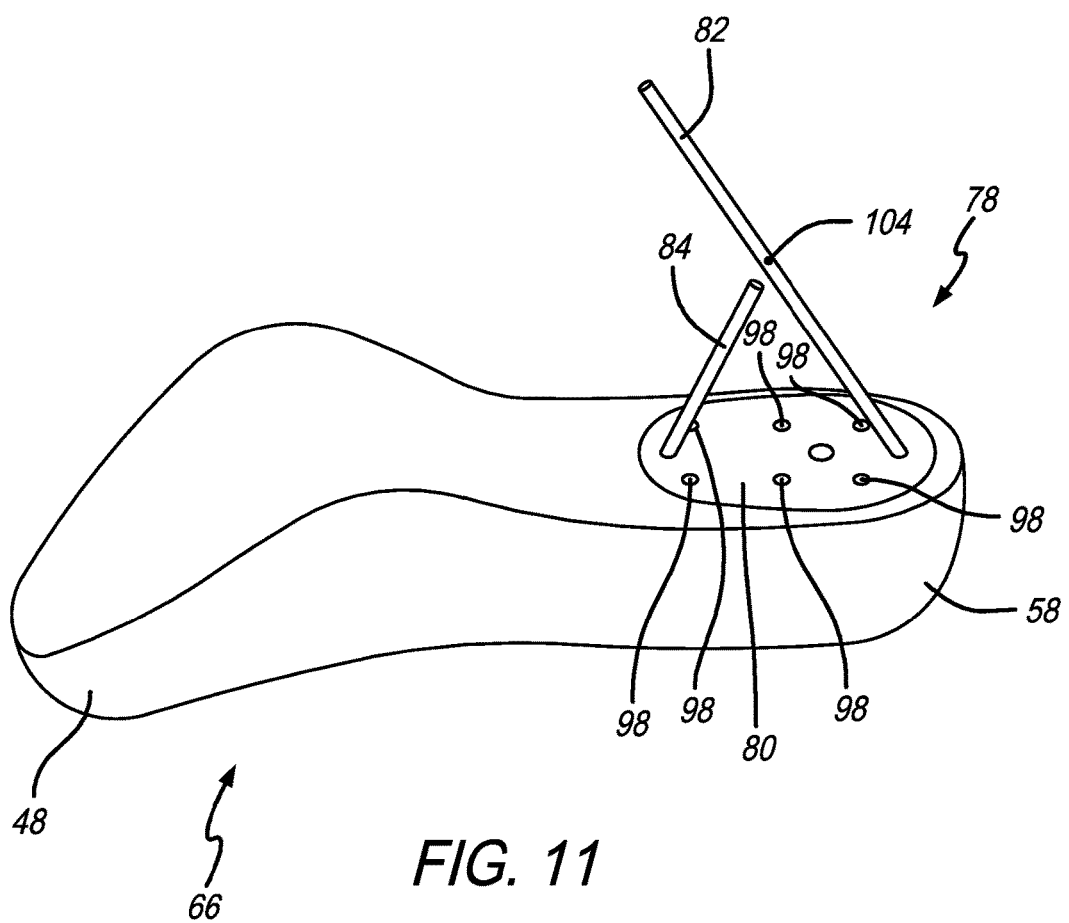
FIG. 11 is a bottom perspective view illustrating attachment of the support core underneath the shoe.

Additionally, for illustrative purposes herein, FIG. 11 illustrates the positioning of the support core 78 when attached to the shoe 66. Here, FIG. 11 omits from view the support 70 to better illustrate the orientation of the rods 82, 84 relative to the support plate 80 once the support core 78 is attached to the shoe 66. As illustrated therein, when viewing the support plate 80 from a generally planar side view, each of the rods 82, 84 extend inwardly toward one another at an angle. Here, the longer rod 82 extends downwardly and forwardly toward the toe box 48 and generally away from the heel section 58. Conversely, the relatively shorter rod 84 extends downwardly and rearwardly away from the toe box 48 and toward the heel section 58. As such, each of the rods 82, 84 extend angularly inwardly toward one another. In one embodiment, the shorter rod 84 may generally extend to approximately a midpoint 104 of the longer rod 82. Although, in other embodiments, the shorter rod 84 may extend to different locations along the length of the longer rod 82, such as closer to or farther from the support plate 80. Although, in general, when the support core 78 attaches to the angled support platform 68 and the rods 82, 84 extend into the rod receiving channels 86, 88 of the support 70, thereby forming the reinforced shoe heel 64, the generally triangular construction of the relative orientation of the support plate 80, the longer rod 82, and the shorter rod 84 provides additional structural support and stability for the reinforced shoe heel 64 as would a triangular truss. The rods 82, 84 may be designed to extend as far down into the support 70 as possible, to provide additional rigidity therein. Obviously, the length of each of the rods 82, 84 will depend on the structure of the support 70. For example, the shorter rod 84 may be relatively longer when used in connection the M-shaped support 70 (FIG. 7) and the shorter rod 84 may be relatively shorter when used in connection with the R-shaped support 70 (FIG. 6), when compared to the length of the shorter rod 84 for use in connection with the K-shaped support 70 disclosed herein. In all embodiments, the reinforced shoe heel 64 has enhanced strength and stability relative to other shoe heels known in the art, such as the prior art high-heel shoe 40 described above.

Figure 13:
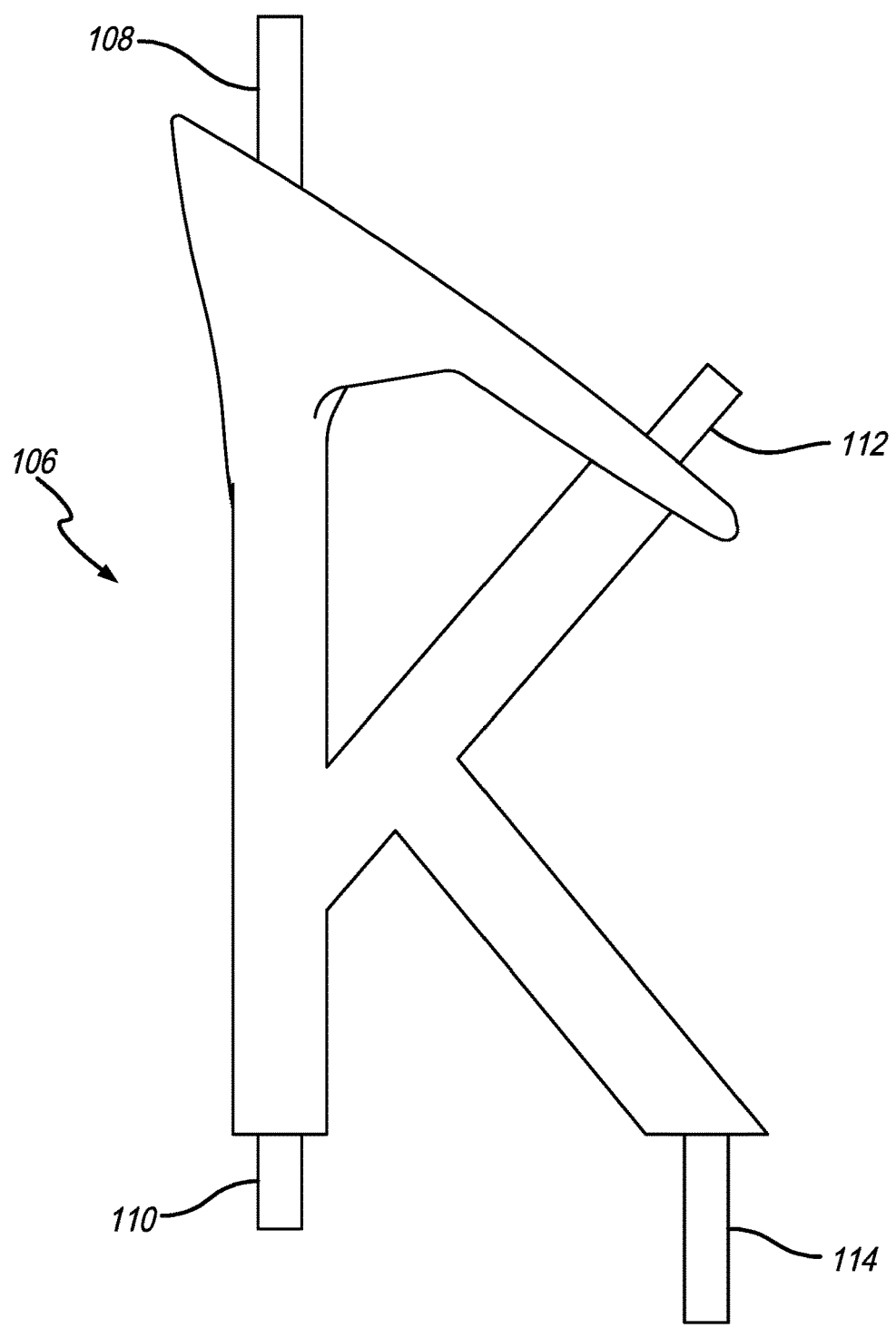
FIG. 13 is a side view of a mold insert for forming a mold having a negative therein for manufacturing K-shaped reinforced shoe heels.

The related process (1200) for manufacturing a high-heel shoe incorporating the reinforced shoe heel 64 as disclosed herein is illustrated with respect to the flowchart of FIG. 12. More specifically, the process (1200) begins by forming a mold insert by 3D printing (1202). In this respect, FIG. 13 illustrates one embodiment of a 3D printed mold insert 106 for use in forming a negative that can be used to manufacture the K-shaped reinforced shoe heel 64. As shown, the mold insert 106 is in the general shape of the letter "K" since, in this embodiment, the reinforced shoe heel 64 is to be K-shaped. Additionally, the 3D printed mold insert 106 includes an upper channel forming extension 108 concentrically located relative to a lower channel forming extension 110. The upper and lower channel forming extensions 108, 110 are commensurate in size with the rod receiving channel 86 designed to selectively receive for slide-in reception the longer rod 82. Similarly, the mold insert 106 also includes a second upper channel forming extension 112 commensurate in size with the rod receiving channel 88 designed to selectively receive for slide-in reception the shorter rod 84. Furthermore, FIG. 13 also illustrates that the mold insert 106 includes a bleed extension 114 for use in forming a resin receiving channel that selectively receives fluid resin that ultimately forms the support 70, as discussed in more detail below.

Figure 14:
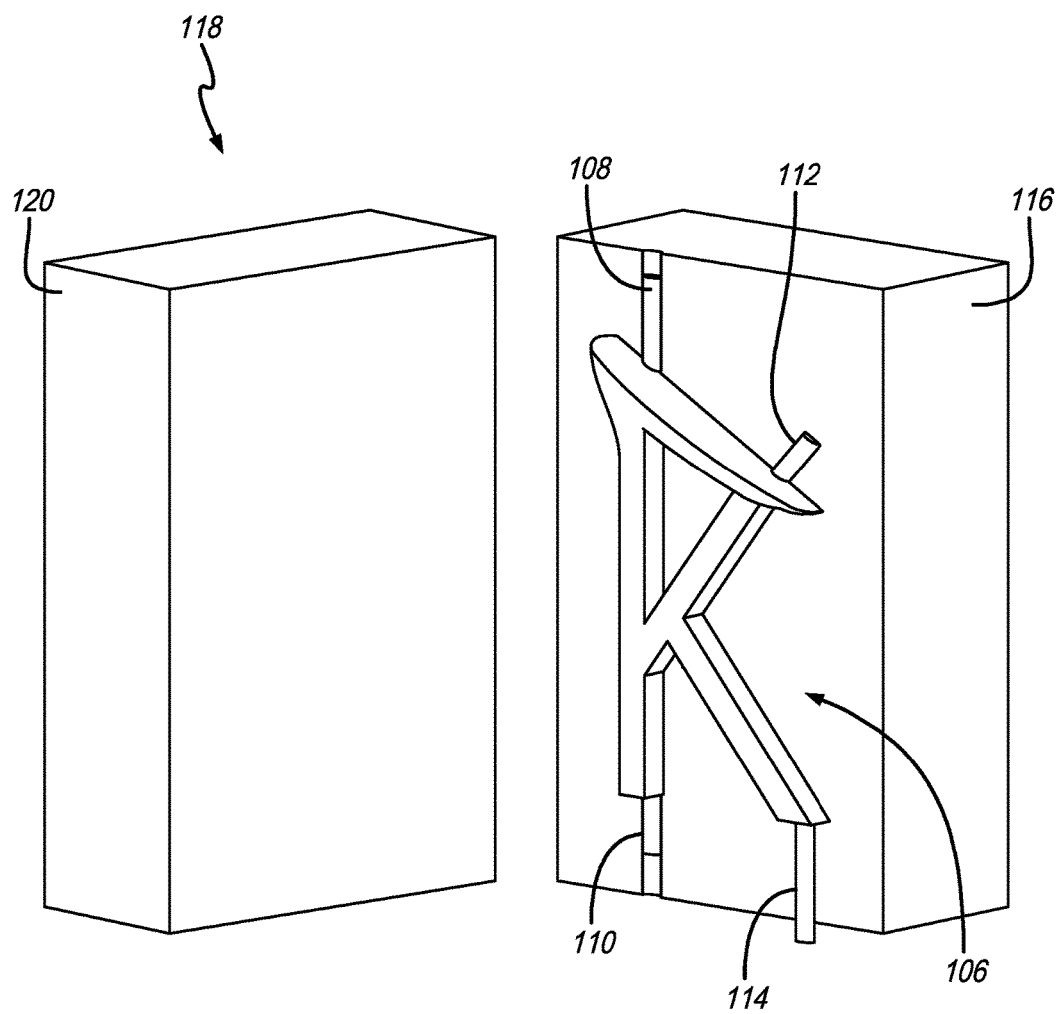
FIG. 14 is a perspective view of an open faced mold having the mold insert placed in one of the cavities and ready to receive clay therein to form an imprint.

Accordingly, after forming the mold insert by 3D printing (1202), the next step is to place the 3D printed mold insert into a mold cavity (1204). In this respect, FIG. 14 illustrates placement of the mold insert 106 within a first cavity 116 of a mold 118. As shown, each of the channel forming extensions 108, 110, 112 reside within the first cavity 116 up to and approximately flush with an outer perimeter thereof. At least the bleed extension 114 generally protrudes out from the outer perimeter of the first cavity 116 to provide access for filling the mold 118 with resin.

Figure 15:
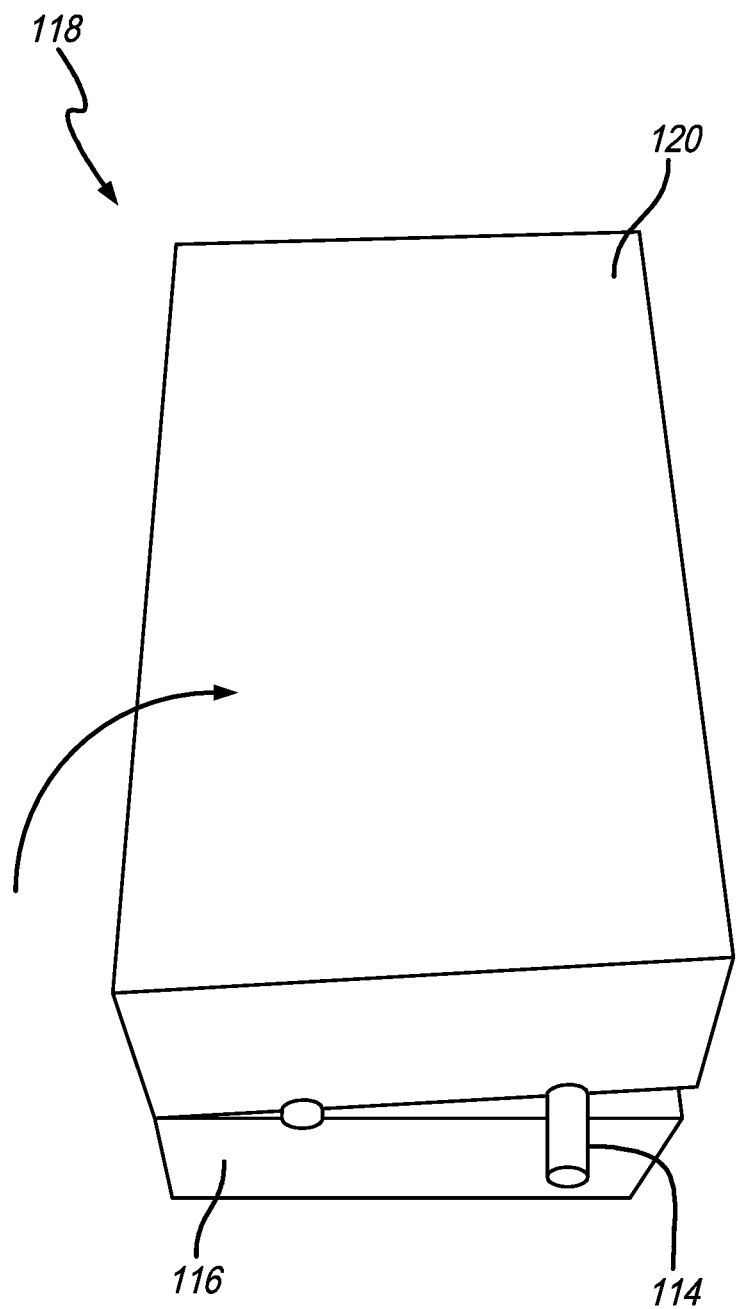
FIG. 15 is a perspective view illustrating closing the mold of FIG. 14 on the mold insert.

The next step is to fill the mold cavity with clay and close the mold cavity around the 3D printed mold insert (1206). In this respect, FIG. 15 generally illustrates closing a second cavity 120 of the mold 118 on to the first cavity 116 now having the mold insert 106 at least partially imprinted therein. As also shown in FIG. 15, the bleed extension 114 continues to extend out from an outer periphery of the now near closed mold 118. As such, upon complete closure of the mold 118, i.e., where the first cavity 116 is positioned in general adjacent relation relative to the second cavity 120, the structure of the 3D printed mold insert 106 imprints therein.

Figure 16:
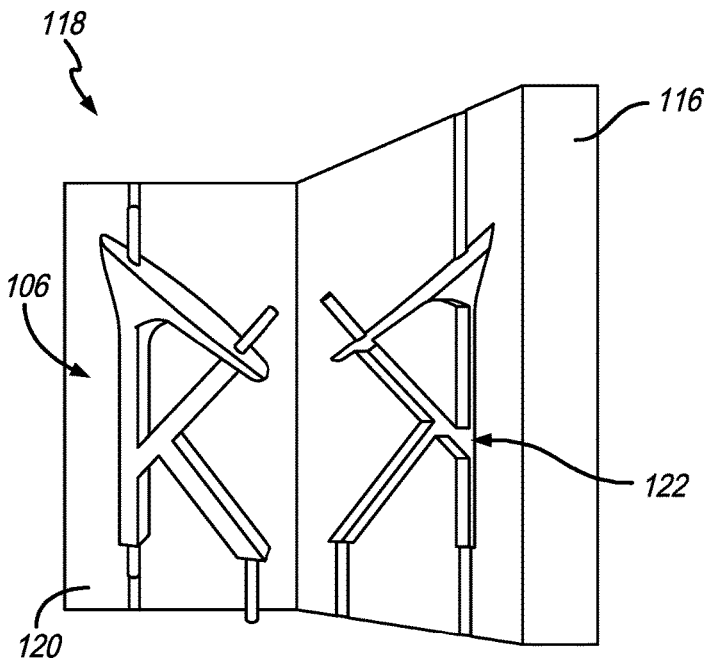
FIG. 16 is a perspective view illustrating opening the closed mold of FIG. 15, with the mold insert in one cavity and a mirror imprint of the mold insert in another cavity.
Figure 17:
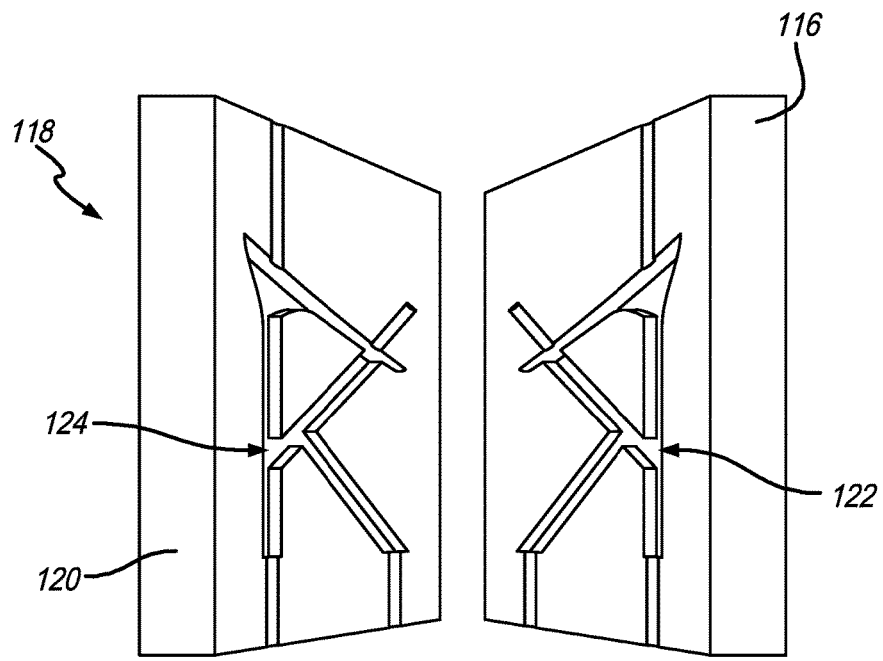
FIG. 17 is a perspective view similar to FIG. 16, further illustrating a imprint in the other cavity once the mold insert is removed therefrom.

Accordingly, the next step is to open the mold with the 3D printed heel imprinted therein (1208). Here, FIG. 16 illustrates the mold 118 in an open position, with the mold insert 106 residing within the second cavity 120 and a mirror imprint 122 now imprinted into the body of the first cavity 116, as shown. The next step (1210) is then to remove the 3D printed mold insert 106 from the mold 118, and specifically out from within the second cavity 120 (as shown moving from FIG. 16 to FIG. 17), to reveal an imprint 124 therein. The combination of the mirror imprint 122 in the first cavity 116 and the imprint 124 in the second cavity 120 form a negative that can be used to produce production-grade supports 70, and in the case of the embodiments illustrated with respect to FIGS. 13-22, in the form of the letter "K".

Figures 18, 19:
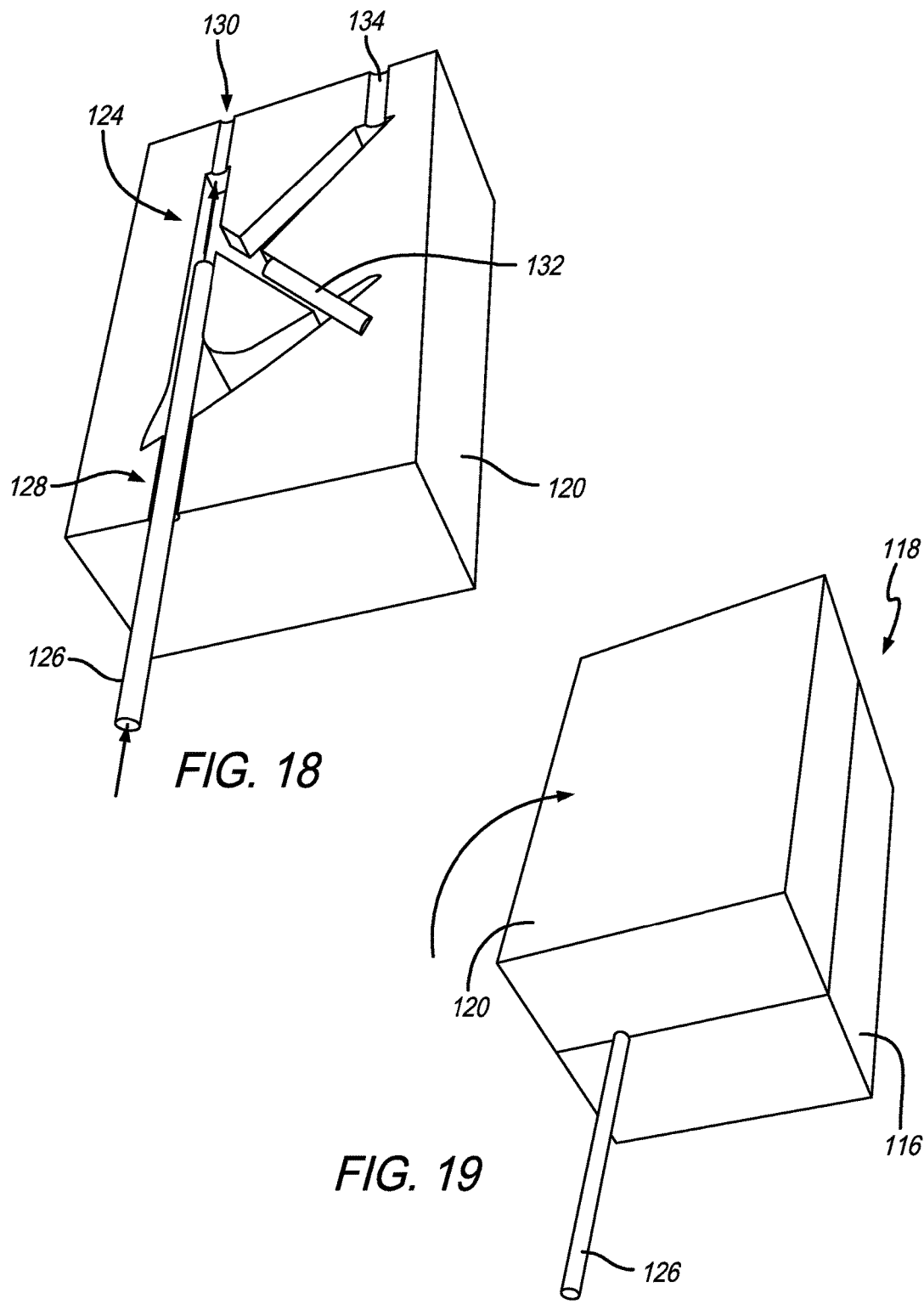
FIG. 18 is a perspective view of one of the mold cavities of FIG. 17, illustrating floating a longer rod and a relatively shorter rod into respective rod floating chambers.
FIG. 19 is a perspective view illustrating closing the mold of FIG. 18 about the longer rod and the shorter rod.

The next step (1212) is to float rods into the mold for creating the rod receiving channels 86, 88. More specifically, FIG. 18 illustrates initial insertion of a channel forming rod 126 into an upper float channel 128 formed from the second cavity 120 by the upper channel forming extension 108 during the mold forming step (1206). In one embodiment, the channel forming rod 126 has a length long enough to extend the height of the second cavity 120. That is, when finally placed therein, the channel forming rod 126 generally resides within each of the upper float channel 128 and the lower float channel 130. Although in other embodiments, the channel forming rod 126 may include two rods, one that extends through the upper float channel 128 and another that extends through the lower float channel 130 (and may extend outside of the mold 118 as illustrated in FIG. 19). In this embodiment, e.g., each of the rods may be magnetized and couple to some location within the interior of the second cavity 120, thereby collectively forming the channel forming rod 126. Locating the channel forming rod 126 within the imprint 124 serves as an obstruction that requires fluid resin to form in and around the channel forming rod 126. The void left by the channel forming rod 126 within the interior of the support 70 effectively forms the rod receiving channel 86.

Similarly, as also illustrated in FIG. 18, a second channel forming rod 132 may be located or seated within the imprint 124 to serve as an obstruction that requires the fluid resin to form in and around the second channel forming rod 132 as well. The void left by the channel forming rod 132 within the interior of the support 70 effectively forms the rod receiving channel 88. Of course, the location of the channel forming rods 126, 132 may vary from embodiment-to-embodiment depending on the structure of the support 70. In this respect, the length of the channel forming rod 126 may be longer and/or shorter than the rod 126 illustrated in FIG. 18 and/or the second channel forming rod 132 may be longer and/or shorter than the rod 132 illustrated in FIG. 18. The length and/or orientation of the rods 126, 132 within the imprint 124 may depend on the size and shape of the alphanumeric character, symbol, etc. being created during the method (1200).

The next step (1214) is to close the mold 118 around the rods 126, 132. As briefly mentioned above, FIG. 19 illustrates the mold 118 in a closed position with each of the first cavity 116 and the second cavity 120 positioned proximate one another and in general flush or face abutting relationship. Moreover, in this position, the cavities 116, 120 cooperate to sandwich each of the channel forming rods 126, 132 therein. In this embodiment, and as briefly mentioned above, the channel forming rod 126 may extend outside of or otherwise hang out of the mold 118 as illustrated in FIG. 19. Moreover, the mold 118 is illustrated in FIGS. 18-19 with a resin receiving channel 134 formed by the bleed extension 114 in an inverted relation for top-down reception of fluid resin therein. Once in the closed position as illustrated in FIG. 19, each of the cavities 116, 120 may be held together by rubber bands or other mechanisms known in the art (e.g., a pressure from a press), for purposes of manufacturing.

Figure 20:
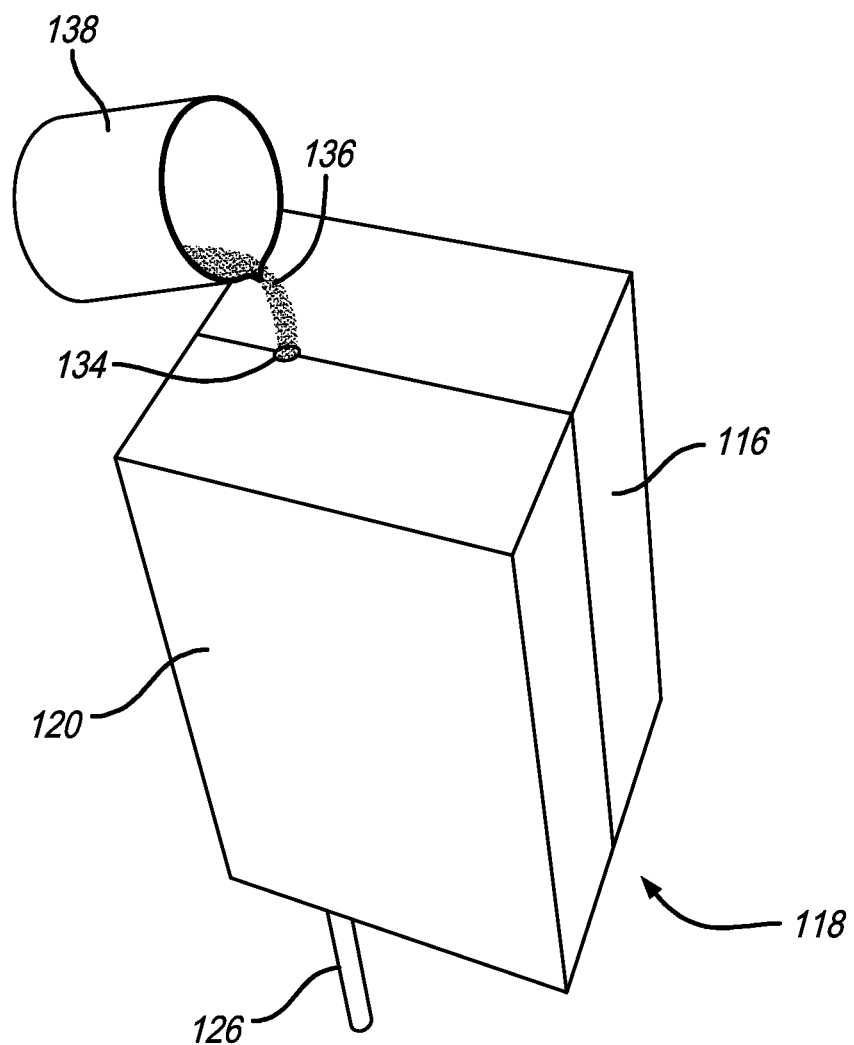
FIG. 20 is a perspective view illustrating filling the now closed mold with fluid molding resin.

Once closed, the next step (1216) is to fill the mold 118 with a fluid molding resin 136 used to form the support 70. For example, FIG. 20 illustrates pouring the fluid molding resin 136 into the resin receiving chamber 134 formed between each of the cavities 116, 120 of the mold 118. This allows the fluid molding resin 136 to fill the interior of the mold 118, and specifically the imprint 124, to form the support 70 therein. Of course, the filling step (1216) could be accomplished by hand (e.g., hand pouring the fluid molding resin 136 therein from the container 138) or the filling step (1216) could be accomplished automatically (e.g., by way of an automatic injection molding process). Once the fluid molding resin 136 fills the imprint 124, the next step (1218) is to cool the mold 118 and cure the fluid molding resin 136 therein. Here, in one embodiment, the mold 118 may need to sit for approximately 80-100 minutes so the fluid molding resin 136 can cure (i.e., harden) inside the mold 118. Although, in other embodiments, the curing time may be more or less, depending on the fluid molding resin used to form the support 70 and the cooling processes employed to cool the mold 118.

Figure 21:
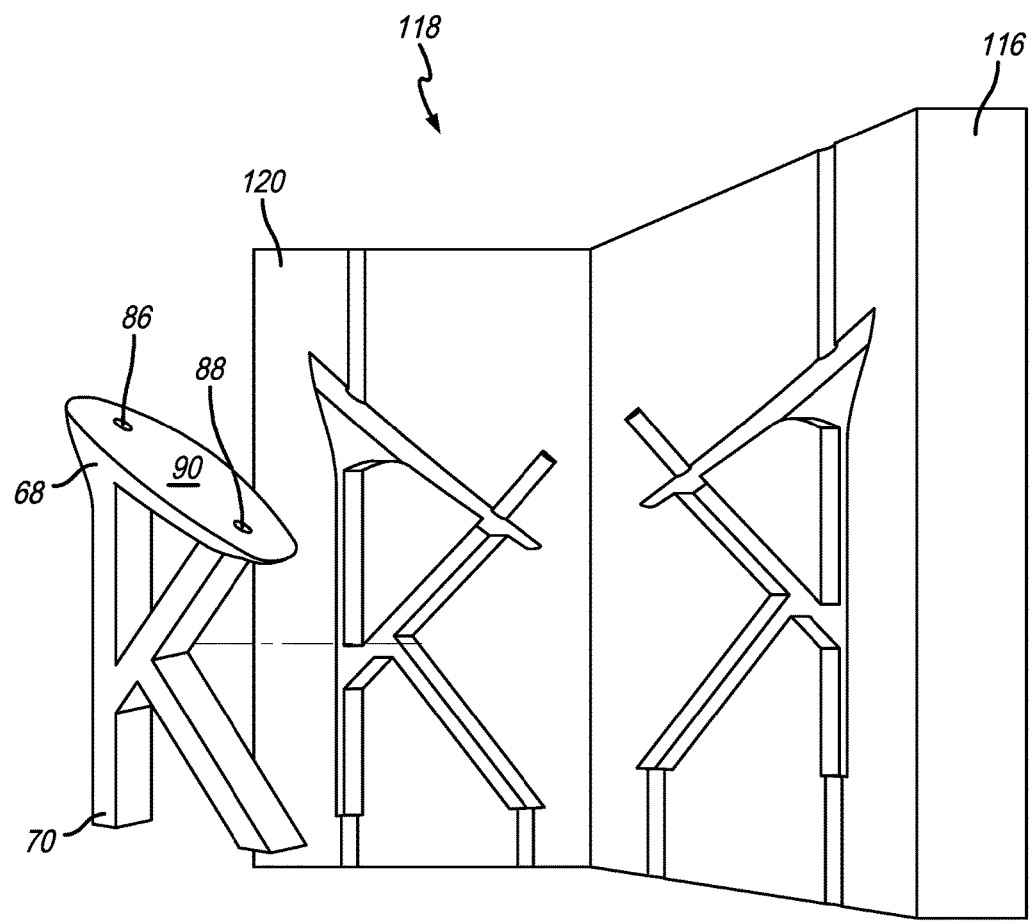
FIG. 21 is a perspective view illustrating removing the now formed K-shaped support from the mold.
Figure 22:
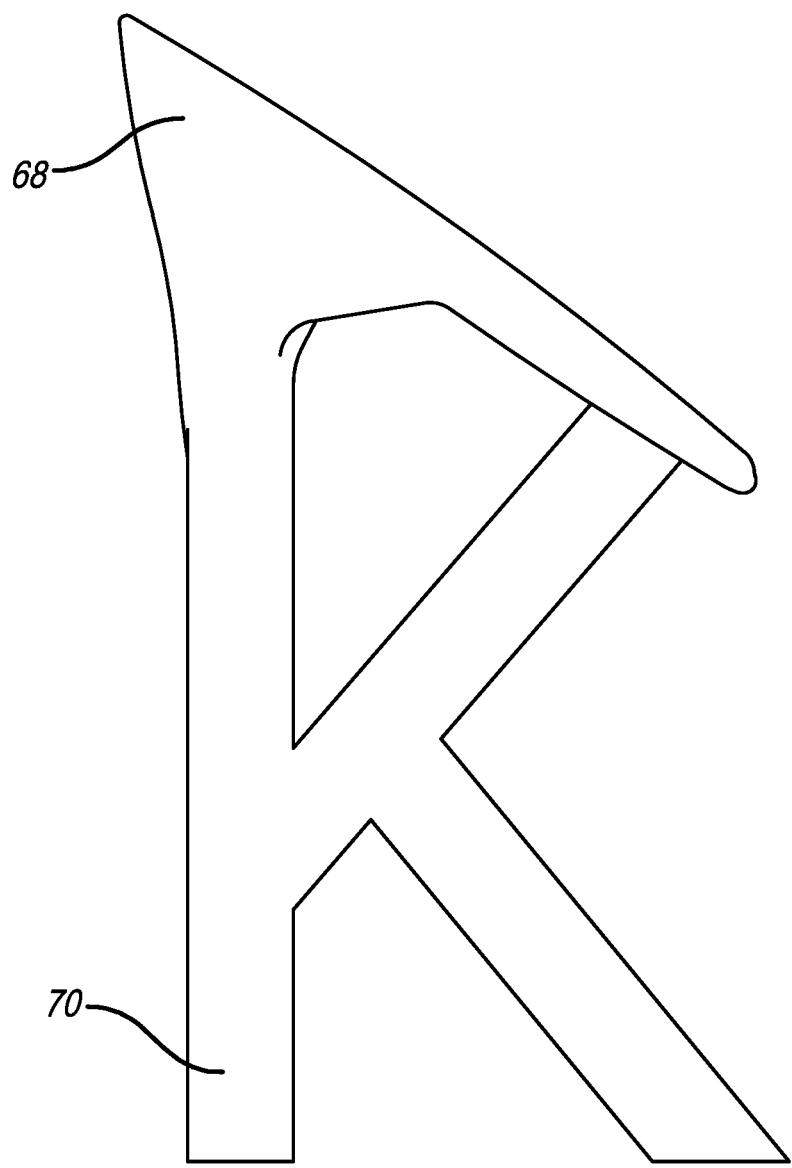
FIG. 22 is a side view of the K-shaped support and integral angled support platform removed from the mold in FIG. 21.

The next step (1220) is to remove the hardened support 70 and integrally formed angled support platform 68 from the mold 118. Here, FIGS. 21 and 22 more specifically illustrate the K-shaped support 70 cured within and now removed from the mold 118. As shown in FIG. 21, the K-shaped support 70 includes the angled support platform 68 having each of the rod receiving channels 86, 88 formed therein as a result of the fluid molding resin 136 forming in and around the obstruction caused by each of the channel forming rods 126, 132 when placed within the interior of the mold 118 during the molding process. These rod receiving channels 86, 88 are configured to receive each of the rods 82, 84, as disclosed herein.

Figure 23:
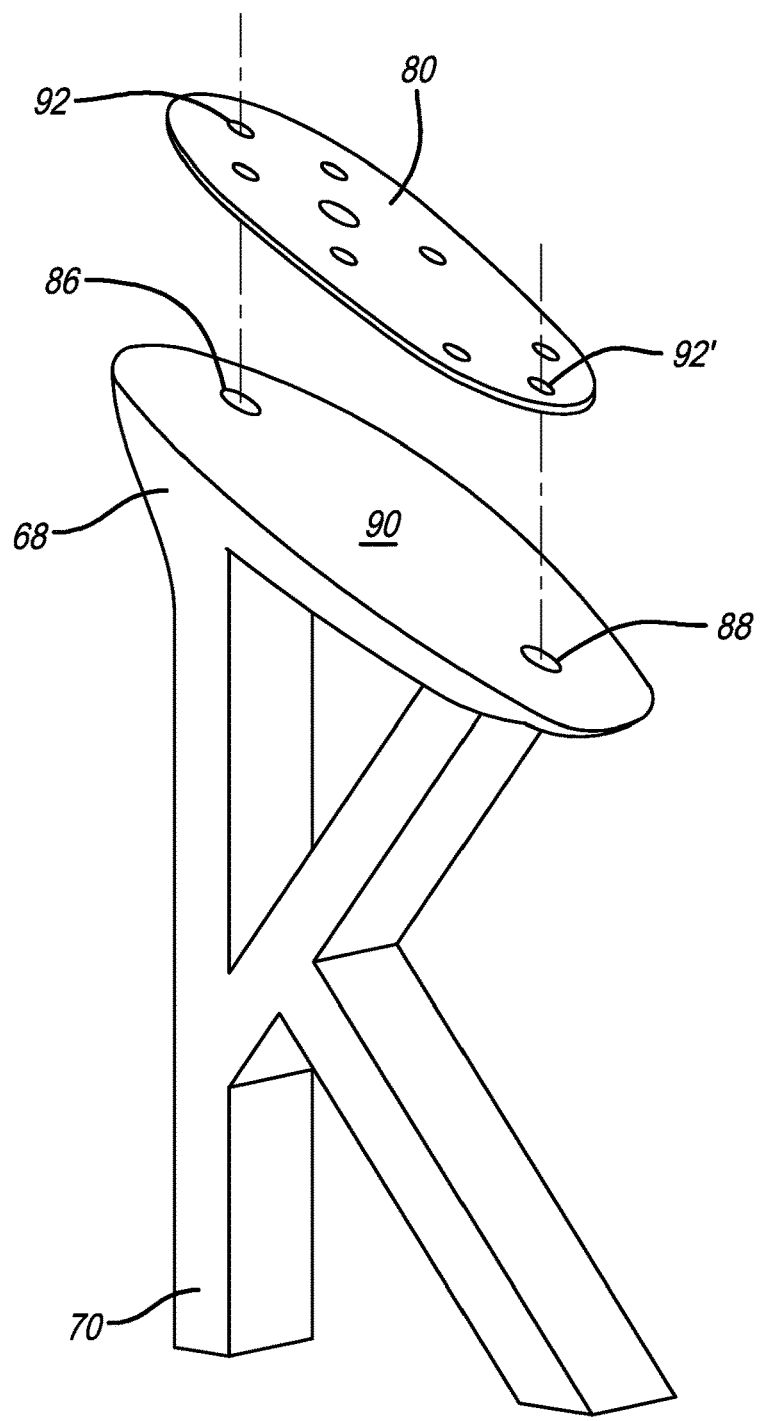
FIG. 23 is a perspective view illustrating attaching the support plate to the angled support platform of the K-shaped support.
Figure 24:
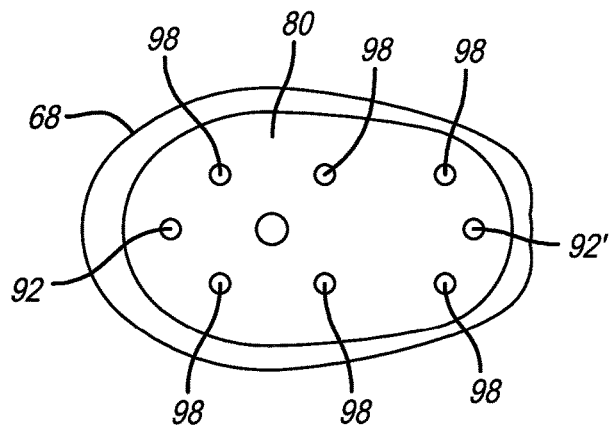
FIG. 24 is a top plan view of the angled support platform with the support platform imbedded thereon.

The next step as illustrated in the process (1200) of FIG. 12 is to embed the support plate on top of the hardened support (1222). In this respect, FIG. 23 illustrates concentrically aligning each of the rod receiving apertures 92, 92' of the support plate 80 with each of the respective rod receiving channels 86, 88 formed in the top surface 90 of the angled support platform 68. As shown in the top plan view of FIG. 24, the surface area of the support plate 80 may be somewhat smaller than the surface area of the angled support platform 68.

Figure 26:
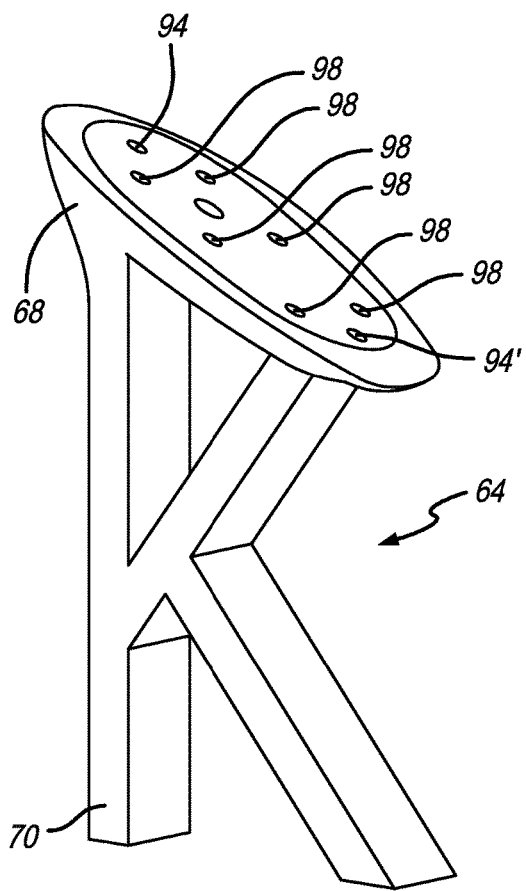
FIG. 26 is a perspective view illustrating an assembled K-shaped reinforced shoe heel having the support plate imbedded thereon and the reinforcement rods inserted therein.

The next step (1224) is to insert each of the rods 86, 88 into each of the respective and now aligned rod receiving apertures 92, 92' in the support plate 80 and each of the rod receiving channels 86, 88 (hidden from view in FIG. 25) in the angled support platform 68, as illustrated generally in FIG. 25. In this respect, and as mentioned above, the relatively longer rod 82 inserts into the rod receiving aperture 92 and the now underlying rod receiving channel 86 and the relatively shorter rod 84 inserts into the rod receiving aperture 92' and the now underlying rod receiving channel 86. Accordingly, the rod receiving channel 86 is relatively longer than the rod receiving channel 88 to accommodate insertion of the relatively longer rod 82 (as opposed to the relatively shorter rod 84). Additionally, each of the rods 82, 84 are inserted at an angle relative to each other such that the final orientation appears similar to that illustrated above with respect to FIG. 11, once attached to the shoe 66. Furthermore, FIG. 26 illustrates that the rods 82, 84 (unnumbered therein) have been attached or secured to the support plate 80 by way of welding or the like, as indicated by the weld points 94, 94', as part of step for securing the rods to the support plate (1226). Of course, the rods 82, 84 can be attached to the support plate 80 by any of the methods as disclosed herein or as otherwise known in the art.

Figure 27:
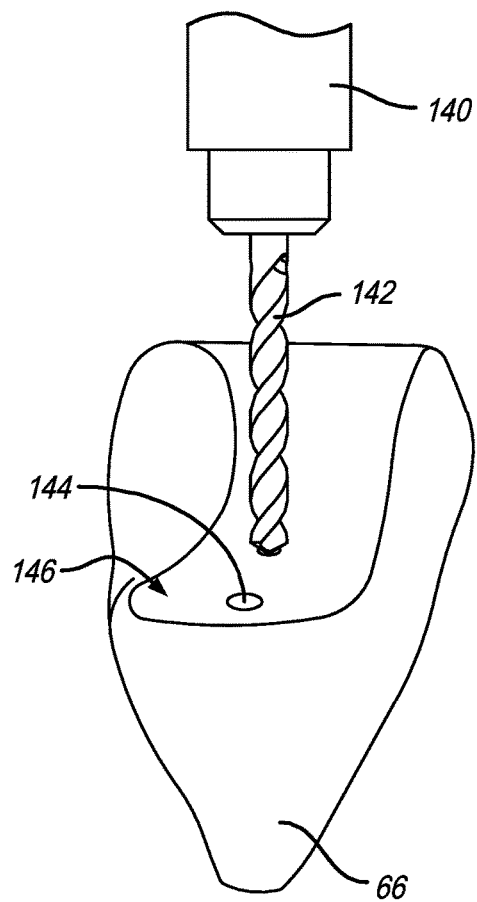
FIG. 27 is a perspective view illustrating drilling a series of holes into a sole of a shoe.

Thereafter, the shoe 66 is prepared by drilling holes into the shoe sole (1228). More specifically, FIG. 27 illustrates using a hand drill 140 with a bit 142 having a size approximately (or somewhat smaller) than that of the size of the heel section mounting apertures 98 in the support plate 80. As shown, the shoe 66 includes one drill hole 144 in a shoe sole 146, with the drill bit 142 beginning to drill a second of the drill holes 144. Each of the drill holes 144 should align with one of the heel section mounting apertures 98, as disclosed herein.

Figure 28:
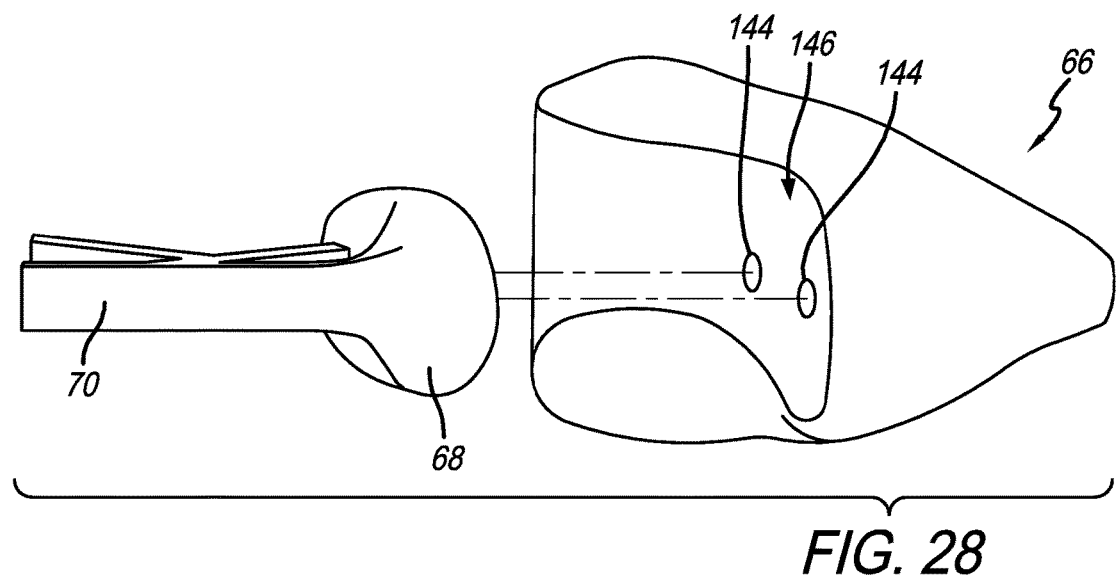
FIG. 28 is a perspective view illustrating aligning the drill holes with a series of heel section mounting apertures in the angled support platform.
Figure 29:
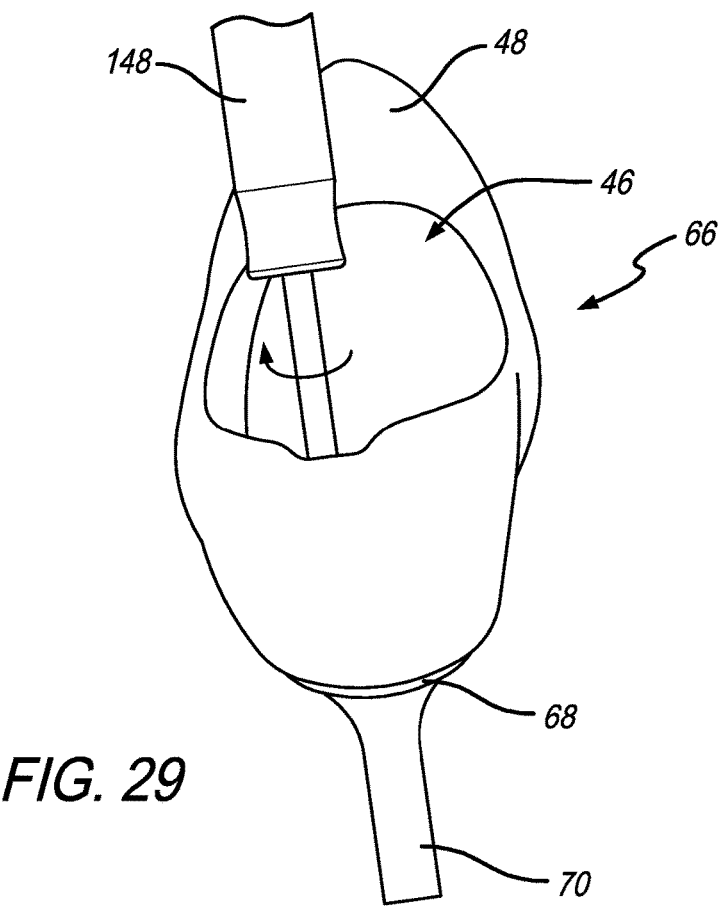
FIG. 29 is a perspective view illustrating attaching the reinforced shoe heel with the shoe by way of threaded engagement of a plurality of screws extending through the shoe sole.

The next step (1230) as illustrated in FIG. 28 is to align the drill holes 144 in the shoe sole 146 with the heel section mounting apertures 98 (not shown in FIG. 28) in the support plate 80 as now imbedded on the angled support platform 68. In one embodiment, the shoe sole 146 includes at least two of the drill holes 144 for alignment with two of the heel section mounting apertures 98 to provide added support. Locating one of the drill holes 144 near the rear of the shoe 66 may provide additional support for the heel of the wearer and locating another of the drill holes 144 toward a front of the shoe 66 may provide additional support at an arch of the shoe 66 when the support 70 attaches to the shoe 66. Although, the shoe sole 146 may include more than two of the drill holes 144 to further increase support, such as six of the drill holes 144 for alignment with six of the heel section mounting apertures 98 (e.g., as illustrated in FIGS. 8-9 and 23-26). Thereafter, the screws 96 (best shown in FIG. 10) are inserted into the drill holes 144 and the heel section mounting apertures 98 through the opening 46. The screws 96 may then be tightened, e.g., with a screwdriver 148 as part of process step (1232). Here, the threads on the screws 96 (or bolts in an alternative embodiment) may threadingly engage the respective drill hole 144, the respective heel section mounting aperture 98, and then into the angled support platform 68 for securement thereto. In alternative embodiments wherein the screws 96 are nails, the screws 96 may be tightened thereto by a hammer. Thereafter, the process (1200) ends in step (1234).

Alternatively, the support 70 may be made from a carbon fiber reinforced material or similar material responsive to compressive stresses that functions like a spring (as opposed to a rigid plastic material). Such a spring-based support 70 may cushion the weight of the wearer to provide additional comfort. Such an embodiment may be particularly useful for use in connection with supports 70 that include some curvature, such as the letter "C", "G", "O", "Q", or "S". The curvature of these letters may provide a certain amount of "give" by the geometry anyway. Furthermore, the letter "S" may also include weights deposited internally to provide additional weighted balance.

Although several embodiments have been described in detail for purposes of illustration, various modifications may be made without departing from the scope and spirit of the invention. Accordingly, the invention is not to be limited, except as by the appended claims.

What is claimed is:

1. A high-heel shoe, comprising:
   a lining coupled with an insole and generally forming a toe box at a front of the high-heel shoe and a heel at a rear of the high-heel shoe;
   a generally horizontally positioned base formed underneath the toe box;
   an upwardly extending shank transitioning away from the generally horizontally positioned base at the front of the high-heel shoe into the heel at the rear of the high-heel shoe, the heel being located in a relatively higher position than the toe box; and
   a high-heel support comprising an alphanumeric character generally positioned up underneath and supporting the relatively higher positioned heel,
   wherein the high-heel support includes an angled platform having an upwardly presented surface area supportive of the heel and integrated with a core, and
   wherein the core includes a pair of separate reinforcement rods generally extending downwardly and inwardly relative to one another without intersecting, having a respective shape and size and being received via respective channels defined by the alphanumeric character.

2. The high-heel shoe of claim 1, wherein the alphanumeric character comprises at least one English-language alphanumeric character, at least one Latin-based alphanumeric character, at least one Japanese-language alphanumeric character, at least one Chinese-language alphanumeric character, at least one Russian-language alphanumeric character, at least one Bengali-language alphanumeric character, at least one Hindi-language alphanumeric character, at least one Hebrew-language alphanumeric character, at least one Arabic-language alphanumeric character, at least one Korean-language alphanumeric character, at least one symbol, at least one shape or a combination thereof.

3. The high-heel shoe of claim 2, wherein the symbol includes a logo.

4. The high-heel shoe of claim 2, wherein the English-language alphanumeric character is selected from the group consisting of 0, 1, 2, 3, 4, 5, 6, 7, 8, 9, A, a, B, b, C, c, D, d, E, e, F, f, G, g, H, h, I, i, J, j, K, k, L, l, M, m, N, n, O, o, P, p, Q, q, R, r, S, s, T, t, U, u, V, v, W, w, X, x, Y, y, Z, and z.

5. The high-heel shoe of claim 2, wherein the symbol is selected from the group consisting of @, *, #, +, $, &, ?, and {.

6. The high-heel shoe of claim 2, wherein the shape comprises a polygon.

7. The high-heel shoe of claim 1, wherein the core includes a support plate disposed between the angled platform and the heel.

8. The high-heel shoe of claim 7, wherein the support plate includes a plurality of heel section mounting apertures for attachment to the heel of the high-heel shoe.

9. The high-heel shoe of claim 8, wherein each of the plurality of heel section mounting apertures is generally equidistantly positioned on opposite sides of a longitudinal axis of the support plate and generally equidistantly positioned on opposite sides of a lateral axis of the support plate.

10. The high-heel shoe of claim 7, wherein the support plate comprises a steel material, an aluminum material, a titanium material, a plastic material or a combination thereof.

11. The high-heel shoe of claim 7, wherein the support plate is coupled with the angled platform and the heel.

12. The high-heel shoe of claim 11, wherein the support plate is coupled with the angled platform and the heel via one coupling location.

13. The high-heel shoe of claim 11, wherein the support plate is coupled with the angled platform and the heel via two or more coupling locations.

14. The high-heel shoe of claim 11, wherein the support plate is coupled with the angled platform via at least one weld, at least one adhesive, at least one fastener including a threaded screw, a non-threaded screw, a rivet, a bolt, or a combination thereof.

15. The high-heel shoe of claim 7, wherein the support plate is imbedded on the angled platform and sandwiched between the angled platform and the heel.

16. The high-heel shoe of claim 7, wherein the support plate has a substantially rectangular shape.

17. The high-heel shoe of claim 7, wherein the support plate extends 40% of the distance from the back of the heel to the front.

18. The high-heel shoe of claim 7, wherein the angled support platform and the support plate extend up underneath the heel, the shank, and the toe box.

19. The high-heel shoe of claim 1, wherein the high-heel support extends about 20% -50% of the way from the heel to the toe box.

20. The high-heel shoe of claim 1, including a plurality of screws extending through the heel and into the high-heel support to draw the heel and the high-heel support into engagement with one another.

21. The high-heel shoe of claim 20, wherein the screws comprise a screw, bolt, or nail.

22. The high-heel shoe of claim 1, wherein the angled platform is directly coupled with the heel.

23. The high-heel shoe of claim 1, wherein said high-heel support comprises a plurality of alphanumeric characters.

24. The high-heel shoe of claim 23, wherein the plurality of alphanumeric characters includes a plurality of linked alphanumeric characters.

25. The high-heel shoe of claim 24, wherein the plurality of linked alphanumeric characters comprises a word.

26. The high-heel shoe of claim 24, wherein the plurality of linked alphanumeric characters comprises a phrase.

27. The high-heel shoe of claim 1, wherein the pair of reinforcement rods includes a first relatively longer reinforcement rod and a second relatively shorter reinforcement rod, being positioned relative to the support plate in a general triangular truss-based configuration.

28. A pair of high-heel shoes, comprising:
a first shoe including a first lining coupled with a first insole and generally forming a first toe box at a front of the first shoe and a first heel at a rear of the first shoe, a first generally horizontally positioned base formed underneath the first toe box, a first upwardly extending shank transitioning away from the first generally horizontally positioned base at the front of the first shoe into the first heel at the rear of the first shoe, the first heel being located in a relatively higher position than the first toe box and a first high-heel support comprising a first alphanumeric character generally positioned up underneath and supporting the relatively higher positioned first heel; and
a second shoe including a second lining coupled with a second insole and generally forming a second toe box at a front of the second shoe and a second heel at a rear of the second shoe, a second generally horizontally positioned base formed underneath the second toe box, a second upwardly extending shank transitioning away from the second generally horizontally positioned base at the front of the second shoe into the second heel at the rear of the second shoe, the second heel being located in a relatively higher position than the second toe box and a second high-heel support comprising a second alphanumeric character generally positioned up underneath and supporting the relatively higher positioned second heel,
wherein the first high-heel support includes a first angled platform having a first upwardly presented surface area supportive of the first heel and being integrated with a first pair of separate reinforcement rods generally extending downwardly and inwardly relative to one another, having a respective shape and size and being received via respective first channels defined by the first alphanumeric character, the first alphanumeric character contacting the first shank only via the first high-heel support, and
wherein the second high-heel support includes a second angled platform having a second upwardly presented surface area supportive of the second heel and being integrated with a second pair of separate reinforcement rods generally extending downwardly and inwardly relative to one another, having a respective shape and size and being received via respective second channels defined by the second alphanumeric character, the second alphanumeric character contacting the second shank only via the second high-heel support.

29. The pair of high-heel shoes of claim 28, wherein the first alphanumeric character is different from the second alphanumeric character.

30. The pair of high-heel shoes of claim 28, wherein the first alphanumeric character and the second alphanumeric character include at least one common alphanumeric character.

31. The high-heel shoe of claim 1, wherein the alphanumeric character comprises a capital letter S.

32. The high-heel shoe of claim 1, wherein the alphanumeric character comprises a capital letter M.

33. The high-heel shoe of claim 1, wherein the alphanumeric character contacts the shank only via the high-heel support.

34. A high-heel shoe, comprising:
a lining coupled with an insole and generally forming a toe box at a front of the high-heel shoe and a heel at a rear of the high-heel shoe;
a generally horizontally positioned base formed underneath the toe box;
an upwardly extending shank transitioning away from the generally horizontally positioned base at the front of the high-heel shoe into the heel at the rear of the high-heel shoe, the heel being located in a relatively higher position than the toe box; and
a high-heel support comprising an alphanumeric character generally positioned up underneath and supporting the relatively higher positioned heel,
wherein the high-heel support includes an angled platform having an upwardly presented surface area supportive of the heel and being integrated with a pair of separate reinforcement rods generally extending downwardly and inwardly relative to one another without intersecting, having a respective shape and size and being received via respective channels defined by the alphanumeric character comprising a capital letter S, and
wherein the alphanumeric character contacts the shank only via the high-heel support.

35. The pair of high-heel shoes of claim 28, wherein the first alphanumeric character comprises a capital letter S and the second alphanumeric character comprises a capital letter M.

36. The high-heel shoe of claim 1, wherein said high-heel support is formed from carbon fiber, a selected metal, a selected metal alloy, a malleable material or a combination thereof.

* * * * *